(12) United States Patent
Brown et al.

(10) Patent No.: US 11,496,310 B2
(45) Date of Patent: Nov. 8, 2022

(54) METHODS AND SYSTEMS FOR UNIVERSAL STORAGE AND ACCESS TO USER-OWNED CREDENTIALS FOR TRANS-INSTITUTIONAL DIGITAL AUTHENTICATION

(71) Applicant: NuID, Inc., San Francisco, CA (US)

(72) Inventors: William Locke Brown, San Francisco, CA (US); Nolan Smith, San Francisco, CA (US)

(73) Assignee: NuID, Inc., San Francisco, CA (US)

( * ) Notice: Subject to any disclaimer, the term of this patent is extended or adjusted under 35 U.S.C. 154(b) by 127 days.

(21) Appl. No.: 17/135,910

(22) Filed: Dec. 28, 2020

(65) Prior Publication Data

US 2021/0258164 A1 Aug. 19, 2021

Related U.S. Application Data

(63) Continuation of application No. 15/922,861, filed on Mar. 15, 2018, now Pat. No. 10,880,089.

(Continued)

(51) Int. Cl.

| | |
|---|---|
| *H04L 29/06* | (2006.01) |
| *H04L 9/32* | (2006.01) |
| *H04L 9/30* | (2006.01) |
| *H04L 9/08* | (2006.01) |
| *H04L 9/40* | (2022.01) |
| *H04L 9/06* | (2006.01) |

(Continued)

(52) U.S. Cl.
CPC ............ *H04L 9/3218* (2013.01); *G06F 21/41* (2013.01); *G06F 21/602* (2013.01); *G06F 21/604* (2013.01); *G06F 21/6218* (2013.01); *H04L 9/0637* (2013.01); *H04L 9/0643* (2013.01); *H04L 9/0861* (2013.01); *H04L 9/3066* (2013.01); *H04L 9/3239* (2013.01); *H04L 63/08* (2013.01); *H04L 63/12* (2013.01); *H04L 9/50* (2022.05)

(58) Field of Classification Search
CPC . G06F 21/602; G06F 21/6218; H04L 9/0637; H04L 9/0643; H04L 9/0861; H04L 9/3239; H04L 63/08; H04L 63/12; H04L 9/50
See application file for complete search history.

(56) References Cited

U.S. PATENT DOCUMENTS

| | | |
|---|---|---|
| 5,241,599 A | 8/1993 | Bellovin |
| 5,440,635 A | 8/1995 | Bellovin |

(Continued)

FOREIGN PATENT DOCUMENTS

EP 2438707 A2 4/2012

OTHER PUBLICATIONS

Final Office Action for U.S. Appl. No. 15/922,861 dated Apr. 30, 2020.

(Continued)

*Primary Examiner* — Izunna Okeke
(74) *Attorney, Agent, or Firm* — Vista IP Law Group, LLP

(57) ABSTRACT

Described is an approach for an improved method, system, and computer program product that performs zero-knowledge proof of knowledge of user identification and/or authentication for a decentralized, trustless storage and management of user identification and/or authentication using one or more distributed ledger systems.

27 Claims, 31 Drawing Sheets

Related U.S. Application Data

(60) Provisional application No. 62/471,894, filed on Mar. 15, 2017.

(51) Int. Cl.
*G06F 21/60* (2013.01)
*G06F 21/62* (2013.01)
*G06F 21/41* (2013.01)
*H04L 9/00* (2022.01)

(56) References Cited

U.S. PATENT DOCUMENTS

| | | | |
|---|---|---|---|
| 6,539,479 B1 | 3/2003 | Wu | |
| 2010/0049875 A1* | 2/2010 | Lu | H04L 9/3297 713/168 |
| 2011/0072269 A1* | 3/2011 | Takechi | H04L 63/0428 713/150 |
| 2016/0162897 A1* | 6/2016 | Feeney | H04L 9/3247 705/71 |
| 2016/0344635 A1* | 11/2016 | Lee | H04W 48/16 |
| 2017/0180128 A1 | 6/2017 | Lu | |
| 2019/0036914 A1* | 1/2019 | Tzur-David | H04L 9/3226 |

OTHER PUBLICATIONS

Non-Final Office Action for U.S. Appl. No. 15/922,861 dated Oct. 21, 2019.
Notice of Allowance for U.S. Appl. No. 15/922,861 dated Jul. 27, 2020.
Notice of Allowance for U.S. Appl. No. 15/922,861 dated Nov. 17, 2020.
Hardjono et al., "anonymous identities for permissioned blockchains", Jan. 2016, Draft v06C.
Miller, Andrew. "Python-zk-proofs", GitHub.com, Nov. 6, 2016, https://github.com/amiller/python-zk-proofs/blob/master/simple-zk-proofs.py.
Bonneau, Joseph et al. "SoK: Research Perspective and Challenges for Bitcoin and Cryptocurrencies", IEEE, 2015 IEEE Symposium on Security and Privacy, May 2015, pp. 1-18.
Hao, F. "Schnorr Non-interactive Zero-Knowledge Proof", IETF Trust, Sep. 2017.
Hao, F. "J-PAKE: Password-Authenticated Key Exchange by Juggling", IETF Trust, Sep. 2017.
Allen, Christopher et al. "Smart Signatures—A White Paper from Rebooting the Web of Trust" Dec. 23, 2015, pp. 1-7.
Sood, Sandeep K et al. "A Secure Dynamic Identity Based Authentication Protocol for Multi-Server Architecture", Journal of Network and Computer Applications, vol. 34, Issue 2, Mar. 2011, pp. 609-618.
Jan, Jinn-Ke et al. "Paramita wisdom password authentication scheme without verification tables" Journal of Systems and Software, vol. 42, Issue 1, Jul. 1998, pp. 45-57.
Schnorr, C.P. "Schnorr's Protocol" 1991.
"True Passwordless Security", HYPR, 2000.
Katz, Jonathan et al. "Two-Server Password-Only Authenticated Key Exchange", Journal of Computerand System Sciences, vol. 78, Issue, Mar. 2012, pp. 651-669.
Hohenberger, Susan. "Lecture 10: More on Proofs of Knowledge" 600.641 Special Topics in Theoretical Cryptography, Lecture 10, Feb. 27, 2007.
Bellovin, Steven M. et al. "Encrypted Key Exchange: Password-Based Protocols Secure Against Dictionary Attacks" IEEE Symposium on Research in Security and Privacy, May 1992.
Bellovin, Steven M. et al. "Augmented Encrypted Key Exchange: A Password-Based Protocol Secure Against Dictionary Attacks and Password File Compromise", CCS '93: Proceedings of the 1st ACM conference on Computerand communications security, Dec. 1993.
Freeman, Mandell David. "Schnorr Identification and Signatures" Oct. 20, 2011.
Biinz, Benedikt et al. "Bulletproofs: Short Proofs for Confidential Transactions and More", Blockstream, 2017, pp. 1-45.
Percival, C. et al. "The Scrypt Password-Based Key Derivation Function", IETF, Aug. 2016, pp. 1-16.
Hunt, P. et al. "System for Cross-domain Identity Management: Protocol", IETF, Sep. 2015, pp. 1-90.
Jones, M. "JSON Web Key (JWK)", IETF, May 2015, pp. 1-41.
Jones, P. et al. "WebFinger", IETF, Sep. 2013, pp. 1-29.
Pornin, T. "Deterministic Usage of the Digital Signature Algorithm (DSA) and Elliptic Curve Digital Signature Algorithm (ECDSA)", IETF, Aug. 2013, pp. 1-80.
Laurie, B. et al., "Certificate Transparency", IETF, Jun. 2013, pp. 1-28.
Hardt, D. "The OAuth 2.0 Authorization Framework", IETF, Oct. 2012, pp. 1-77.
Sheffer, Y. et al. "An EAP Authentication Method Based on the Encrypted Key Exchange (EKE) Protocol", IETF, Feb. 2011, pp. 1-34.
Krawczy, H. et al. "HMAC-based Extract-and-Expand Key Derivation Function (HKDF)", IETF, May 2010, pp. 1-15.
Wu, T. "The SRP Authentication and Key Exchange System", The Internet Society, Sep. 2000, pp. 1-9.
Miller, Andrew. "Zero Knowledge Proofs", Lecture 7, ECE/CS 598AM: Cryptocurrency Security, Fall 2016, pp. 1-4.
Miller, Andrew et al. "Permacoin: Repurposing Bitcoin Work for Data Preservation", IEEE, Proceedings of the IEEE Symposium on Security and Privacy, May 2014, Pages.
Miller, Andrew et al. "Authenticated Data Structures, Generically", POPL 2014, pp. 1-16.
Marlinspike, Moxie et al. "The Sesame Algorithm: Session Management for Asynchronous Message Encryption", 2017. pp. 1-20.
Sporny, Manu et al. "A Decentralized Hashtable for the Web", (Nov. 5, 2015) from https://web.archive.org/web/20151105132728/https://opencreds.org/specs/source/webd (Publication date based on indicated capture date by Archive.org; first publication date unknown).
Preziuso, Michele. "Password Hashing: PBKDF2, Scrypt, Bcrypt", Jun. 22, 2015, Medium, pp. 1-4.
Reichl, Dominik. "KeePass Password Safe", 2003, p. 1.
Kun, Jeremy. "Elliptic Curves as Python Objects", Feb. 24, 2014, Math ∩ Programming, pp. 1-11.
Yang, Fuw-Yi. "A Secure Scheme for Authenticated Encryption", 2005, Chienkuo Technology University, Taiwan, pp. 1-19.
Melara, Marcela S. et al. "CONIKS: Bringing Key Transparency to End Users", 2015, Stanford University/Electronic Frontier Foundation, pp. 1-17.
Lindell, Yehuda. "An Efficient Transform from Sigma Protocols to NIZK with a CRS and Non-Programmable Random Oracle", Sep. 6, 2015. Dept. of Computer Science, Bar-Ilan, Israel, pp. 1-16.
Garman, Christina et al. "Decentralized Anonymous Credentials", Oct. 15, 2013. The Johns Hopkins University Department of Science, Baltimore, MD, pp. 1-21.
Chase, Melissa et al. "Efficient Zero-Knowledge Proof of Algebraic and Non-Algebraic Statements with Applications to Privacy Preserving Credentials", 2016. Microsoft Research, pp. 1-30.
Cheon, Jung Hee et al. "Ghostshell: Secure Biometric Authentication using Integrity-based Homomorphic Evaluations", 2016. Department of Mathematical Sciences, Seoul National University, pp. 1-25.
Chou, Jue-Sam et al. "Cryptanalysis of the Yang-Wang's password authentication schemes", 2005. IACR Cryptology ePrint Archive, pp. 1-8.
Scott, Michael. "Slothful reduction", 2017. IACR Cryptology ePrint Archive, pp. 1-14.
Katz, Jonathan et al. "Predicate Encryption Supporting Disjunctions, Polynomial Equations, and Inner Products", 2008. IACR Cryptology ePrint Archive, pp. 1-29.
Kate, Aniket et al. "Distributed Key Generation in the Wild", 2012. IACR Cryptology ePrint Archive, pp. 1-30.
Katz. Jonathan et al. "Round-Optimal Password-Based Authenticated Key Exchange", 2011. Theory of Cryptography, Lecture Notes in Computer Science, vol. 6597, Springer, Berlin, Heidelberg, pp. 1-28.

(56) References Cited

OTHER PUBLICATIONS

Wang, Xiao et al. "Global-Scale Secure Multiparty Computation", 2017. Association for Computing Machinery, Proceedings of the 2017 ACM SIGSAC Conference on Computer and Communications Security, pp. 1-35.

Giacomelli, Irene et al. "ZKBoo: Faster Zero-Knowledge for Boolean Circuits", 2016. 25th Security Symposium Security 16, UNISEX Association, Austin, TX, pp. 1-24.

Green, Matthew et al. "Universally Composable Adaptive Oblivious Transfer", 2008. Advances in Cryptology, ASIACRYPT 2008, Lecture Notes in Computer Science, vol. 5350, Springer, Berlin, Heidelberg, pp. 1-31.

Hao, Feng. "On Robust Key Agreement Based on Public Key Authentication", 2010. Financial Cryptography and Data Security, Lecture Notes in Computer Science, vol. 6052, Springer, Berlin, Heidelberg, pp. 1-10.

Camenisch, Jan et al. "Universally Composable Direct Anonymous Attestation", 2016. Public-Key Cryptography, PKC 2016, Lecture Notes in Computer Science, vol. 9615, Springer, Berlin, Heidelberg, pp. 1-72.

Nguyen, Lan. "Accumulators from Bilinear Pairings and Applications to ID-based Ring Signatures and Group Membership Revocation", 2005. Topics in Cryptology, CT-RSA 2005, Lecture Notes in Computer Science, vol. 3376, Springer, Berlin, Heidelberg, pp. 1-32.

Alkim, Erdem et al. "NewHope without reconciliation", 2016. Cryptology ePrint Archive, Report 2016/1157, pp. 1-9.

Choudhuri, Arka Rai et al. "Fairness in an Unfair World: Fair Multiparty Computation from public Bulletin Boards", 2017. Association for Computing Machinery, Proceedings of the 2017 ACM SIGSAC Conference on Computer and Communications Security, pp. 1-35.

Canetti Ran. "Universally Composable Security: A New Paradigm for Cryptographic Protocols", (Jul. 16, 2013) from https://web.archive.org/web/20140407115138/https://eprint.iacr.org/2000/067.pdf (Publication date based on indicated capture date by Archive.org; first publication date unknown).

Laer, Gijs Van et al. "Harden Zero Knowledge Password Proofs Against Offline Dictionary Attacks", Dec. 12, 2016. pp. 1-24.

Camenisch, Jan et al. "An Efficient System for Non-transferable Anonymous Credentials with Optional Anonymity Revocation", 2001. Advances in Cryptology, EUROCRYPT 2001, Lecture Notes in Computer Science, vol. 2045, Springer, Berlin, Heidelberg, pp. 1-30.

"Schnorr", (Aug. 31, 2017), from https://web.archive.org/web/20171126023124/https://en.bitcoin.it/wiki/Schnorr (Publication date based on indicated capture date by Archive.org; first publication date unknown).

Blum, Manuel et al. "Non-interactive zero-knowledge and its applications", 1988. Association for Computing Machinery, Proceedings of the Twentieth Annual ACM Symposium on Theory of Computing, pp. 1-4.

Bobolz, Jan. "Efficient Verifier-Local Revocation for Anonymous Credentials", Nov. 2, 2015. Universität Paderborn, pp. 1-104.

Lynn, Ben. "Zero-Knowledge Proofs", (May 8, 2014) from https://web.archive.org/web/20140508163209/https://crypto.stanford.edu/pbc/notes/crypto/zk.html (Publication date based on indicated capture date by Archive.org; first publication date unknown).

Bunz, Benedikt et al. "Bulletproofs: Short Proofs for Confidential Transactions and More", 2017. Cryptology ePrint Archive, pp. 1-45.

Connect2id Ltd, "About the Connect2id company", (Apr. 22, 2014) from https://web.archive.org/web/20140422224327/https://connect2id.com/about (Publication date based on indicated capture date by Archive.org; first publication date unknown).

Boneh, Dan et al. "Short Signatures from the Weil Pairing", 2001. Advances in Cryptology, ASIACRYPT 2001, Lecture Notes in Computer Science, vol. 2248, Springer, Berlin, Heidelberg, pp. 1-19.

Kiayias. "Zero-knowledge Proofs", (May 28, 2016) from https://web.archive.org/web/20160528093529/http://cgi.di.uoa.gr/~aggelos/crypto/assets/7_zk_handout.pdf (Publication date based on indicated capture date by Archive.org; first publication date unknown).

Valsorda, Filippo, "The Scrypt Parameters", Oct. 4, 2017. Crypto, Mainline, pp. 1-8.

Green, Matthew et al. "Zero Knowledge Proofs: An illustrated primer", Nov. 27, 2014. A Few Thoughts on Cryptographic Engineering, pp. 1-17.

Corbellini, Andrea. "Elliptic Curve Cryptography: a gentle introduction", May 17, 2015. pp. 1-20.

"Scrypt's maximum strength to increase entropy of lame passwords", 2013. Stack Exchange, Cryptography.

Vryonis, Panayotis. "Public-Key Cryptography for Non-Geeks" Aug. 28, 2013. pp. 1-7.

Inkster, Toby et al. "WebID Authentication over TLS", Mar. 5, 2014. W3C.

Balfanz, Dirk et al. "Web Authentication: An API for accessing Public Key Credentials", (Mar. 4, 2019) from https://web.archive.org/web/20170606102316/https://www.w3.org/TR/webauthn/#biblio-rfc7049 (Publication date based on indicated capture date by Archive.org; first publication date unknown).

Belvin, Gary. "Key Transparency Overview", Sep. 2016. GitHub, Inc.

Entrust Inc., "Zero to ECC in 30 Minutes: A primer on elliptic curve cryptography", 2014. pp. 1-23.

Koens, Tommy et al. "Efficient Zero-Knowledge Range Proofs in Ethereum", 2017. pp. 1-110.

Hassan, Ahmed Shamim. "How Do You Authenticate, Mate? A definitive guide for software developers to authentication", Oct. 21, 2017. HackerNoon.

Mamoria, Mohit. "The ultimate, 3500-word, plain English guide to blockchain", Nov. 1, 2017. The Next Web.

Tyson, Jeff. "How Encryption Works", Apr. 6, 2001. HowStuffWorks, https://computer.howstuffworks.com/encryption.htm/printable.

Vryonis, Panayotis. "Explaining Public-Key Cryptography to Non-Geeks" Aug. 27, 2013. Medium.

Reitwiessner, Christian. "zkSNARKs in a Nutshell", Dec. 5, 2016. Ethereum Blog.

Alcaide, Almudena et al. "Anonymous authentication for privacy-preserving IoT target-driven applications", Sep. 2013. vol. 37 pp. 111-123.

"Uport", (Aug. 7, 2013) from https://web.archive.org/web/20130807215726/https://www.uport.me/ (Publication date based on indicated capture date by Archive.org; first publication date unknown).

"The Credibility Network for the Entire Global Economy", (Jan. 28, 2018) from https://web.archive.org/web/20180128165400/https://www.shyft.network/ (Publication date based on indicated capture date by Archive.org; first publication date unknown).

"Identos" (Jan. 10, 2015) from https://web.archive.org/web/20150110014016/https://identos.com/ (Publication date based on indicated capture date by Archive.org; first publication date unknown).

Ali, Muneeb et al. "A Global Naming and Storage System Secured by Blockchains", 2016. 2016 USENIX Annual Technical Conference, Denver, CO.

Brown, Richard Gendal et al. "Corda: An Introduction", Aug. 2016.

Smith, Michael A. "Creating Assurance in Blockchain", Mar. 1, 2017. ISACA Journal, vol. 2, pp. 1-2.

Allen, Christopher et al. "Decentralized Public Key Infrastructure", Jul. 13, 2017. A White Paper from Rebooting the Web of Trust.

Zyskind, Guy et al. "Enigma: Decentralized Computation Platform with Guaranteed Privacy", Jun. 10, 2015.

"The Digital Asset Platform", Dec. 2016. Non-technical White Paper, Digital Asset.

Kiayias, Aggelos et al. "Foundations of Blockchain Protocols", 2016.

Smith, Samuel M. "Identity System Essentials", Mar. 29, 2016.

Batiz-Benet, Juan. "IPFS—Content Addressed, Versioned, P2P File System", Jul. 14, 2014. arXiv preprint, pp. 1-11.

One World Identity, LLC. "Don't Believe The (Blockchain) Hype: The Definitive Primer On Identity And Blockchain", Jul. 2017.

Rivetz Intl. "A Wholly Owned Subsidiary of Rivetz Corp.", Jun. 29, 2017. White Paper, Version 1.02, Cybersecurity for decentralized systems, pp. 1-34.

(56) References Cited

OTHER PUBLICATIONS

Sovrin. "A Protocol and token for Self-Sovereign Identity and Decentralized Trust", Nov. 2017. A White Paper from the Sovrin Foundation, pp. 1-41.
Lundkvist, Christian et al. "Uport: A Platform For Self-Sovereign Identity", Feb. 21, 2017. Uport White Paper Draft, pp. 1-16.
Mercer, Rebekah. "Privacy on the blockchain: Unique ring signatures." arXiv preprint arXiv:1612.01188 (2016).
International Search Report and Written Opinion dated May 14, 2018 for PCT Appln. No. PCT/US2018/022765.
Extended European Search Report for EP Patent Appln. No. 18768247.1 dated Dec. 2, 2020.
Fromknecht C. et al.: "A Decentralized Public Key Infrastructure with Identity Retention", IACR ePrint, vol. 20141111:124302, Nov. 11, 2014, pp. 1-16, XP061 017286.
Leiding B. et al.: "Authcoin: Validation and Authentication in Decentralized Networks", Sep. 16, 2016, XP05575271 0, From: https://arxiv.org/pdf/1609.04955.
Hao F.: "Schnorr NIZK Proof: Non-interactive Zero Knowledge Proof for Discrete Logarithm; draft-hao-schnorr-05.txt", IETF, Nov. 14, 2016, pp. 1-11, XP015116614.

\* cited by examiner

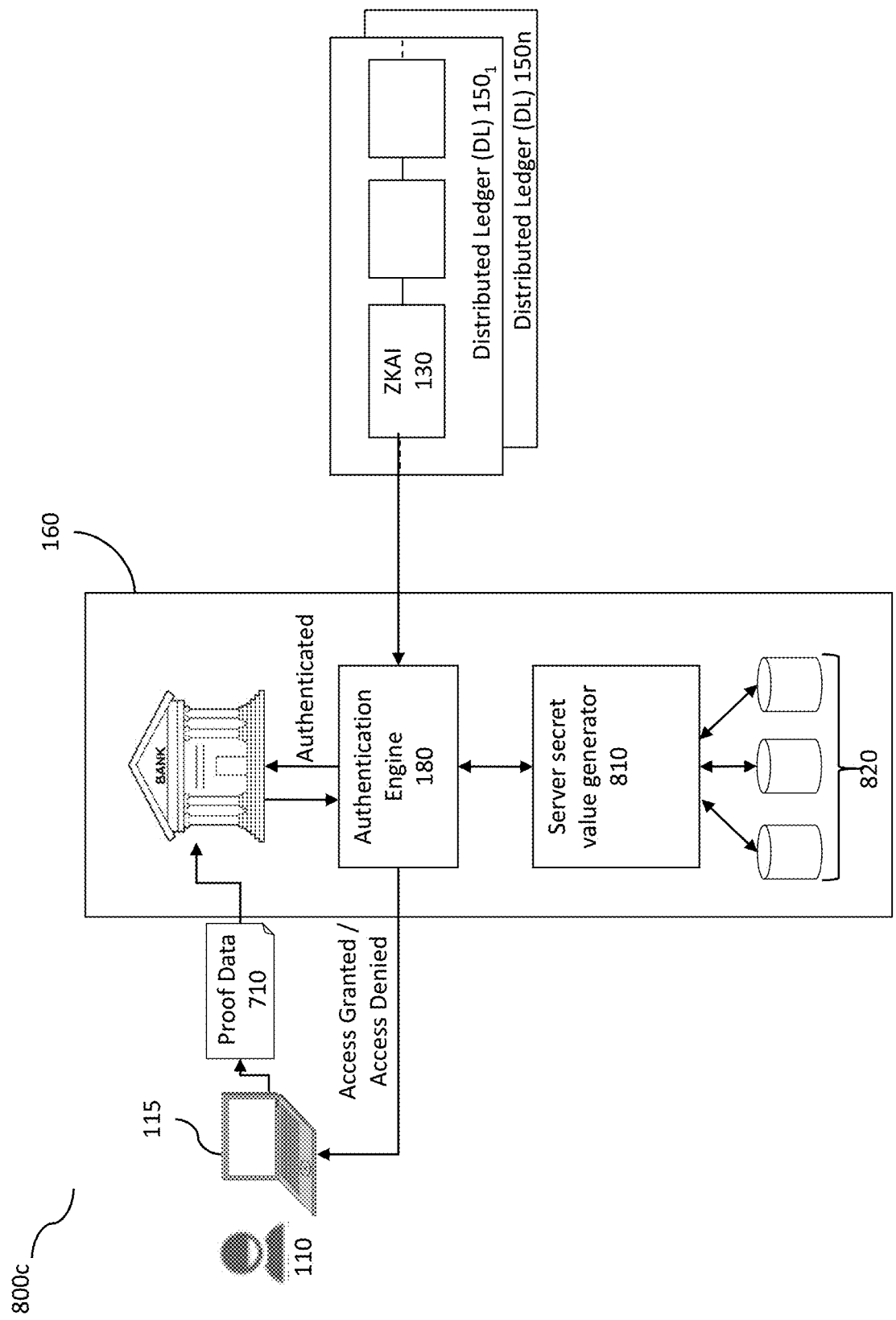

METHODS AND SYSTEMS FOR UNIVERSAL STORAGE AND ACCESS TO USER-OWNED CREDENTIALS FOR TRANS-INSTITUTIONAL DIGITAL AUTHENTICATION

RELATED APPLICATION(S)

This present application is a continuation of U.S. application Ser. No. 15/922,861 filed on Mar. 15, 2018, titled "METHODS AND SYSTEMS FOR UNIVERSAL STORAGE AND ACCESS TO USER-OWNED CREDENTIALS FOR TRANS-INSTITUTIONAL DIGITAL AUTHENTICATION" and claims the benefit of U.S. Provisional Application No. 62/471,894 filed Mar. 15, 2017, titled "Methods, Apparatus and Systems for Distributed Trustless Authentication", which are hereby incorporated by reference in its entirety.

FIELD

This disclosure relates to storing cryptographic parameters on a distributed ledger for authenticating user credentials without a trusted execution environment.

BACKGROUND

The Internet humbly began with researchers at renowned institutions. The scale was such that user identities were taken for granted; each network participant knew every other participant intimately. As such the core web infrastructure that exists today lacks a standardized identity authentication specification.

Various solutions for identity authentication have been proposed and implemented with varying levels of success and adoption. Examples of these patchwork solutions include Open Authorization (OAuth), Domain Name System Security Extensions (DNSSEC), and multi-factor authentication (MFA) mechanisms (e.g. app-based and SMS-based code generators), each an attempt at creating more secure, albeit centralized, key management and authentication workflows.

More recently, the commonly accepted model for authentication, where the authenticator (e.g. a server governed by an online service) is trusted to manage credentials, has been a target of skepticism. Negligent and malicious handling of user data have caused users to increasingly perceive historically trusted 3rd parties as a threat.

One of the main problems with legacy approaches for authentication is that they rely heavily on centralized servers and service providers with large "honey pots" of user credentials and data that serve as targets for attackers. If an attacker obtains access to the centralized servers having the large amount of user credentials and data, the target becomes more appealing to an attacker and the reward is much greater, given the amount of sensitive data available in the centralized for the attacker to steal.

"Trustless" authentication mechanisms where authenticators are not entrusted with user credentials, have been a research topic since the 1990's, and have produced a body of seminal protocols such as secure remote password (SRP), encrypted key exchange (EKE), and other password authenticated key exchange (PAKE) mechanisms. Here, too, adoption suffers as many of the protocols require complicated implementations with few references. Further, the protocols themselves often bind a user's identity to a specific credential stored privately on a device or trusted server such that loss or corruption of the device or breach of server can incur severe losses.

Therefore, there is a need for methods and/or system for processing and storing user identification and authentication to solve the identified problems.

SUMMARY

According to some embodiments, described is an improved method, system, and computer program product that performs a zero-knowledge proof of knowledge (ZKPoK) of user identification and/or authentication. Zero-knowledge proofs are cryptographic protocols that allow a prover to prove that they have some knowledge of a certain kind, without revealing any additional information about that knowledge. The ZKPoK may be generated from a secret user credential. The secret user credential may take the form of any private and reproducible digital information, including but not limited to, for example, passwords, PINs, private keys, biometrics, hardware security modules, and/or algorithmic identifiers. A verifier knowledge such as a zero-knowledge authentication information (ZKAI), which may also be derived from the user secret does not contain any private information of the secret user credential, may be appended to a distributed ledger as defined by ledger-specific semantics.

Authentication may then be performed by validating a prover's knowledge, received as secret parameters from the user, wherein a portion of the prover's knowledge was used to generate the ZKAI stored in the immutable distributed ledger entry as defined by a zero-knowledge protocol. Authentication may be performed to compare the received secret parameters received from the user against the ZKAI received from the distributed ledger to determine if the user is who the user claims to be. This process forms the basis of extensible methods and systems for securely managing network credentials, data, and identities.

In one embodiment, a computer-implemented method includes receiving a first request for generating a zero-knowledge authentication information from a user. The method also includes generating a zero-knowledge authentication information with zero knowledge of a user secret. The method further includes recording the zero-knowledge authentication information as a distributed ledger (DL) transaction on a distributed ledger (DL). Moreover, the method includes authenticating the user using the zero-knowledge authentication information recorded on the DL and proof data received from the user. Furthermore, the method includes providing user access upon determination the user is authenticated.

In one or more embodiments, the method may also include receiving a transaction ID corresponding to the zero-knowledge authentication information recorded on the DL. Furthermore, the method includes registering the transaction ID corresponding to the user. Moreover, the method includes receiving a proof data from the user as a second request to prove an identity of the user and verifying an authenticity of the user by retrieving the zero-knowledge authentication information from the DL corresponding to the user and comparing the proof data received from a computing device of the user and the zero-knowledge authentication information retrieved.

In one or more embodiments, the first request includes a userid uniquely identifying the user and one or more user secrets, wherein a user secret is a privately held reproducible digital information that is reproducible by the user. The zero-knowledge authentication information is generated based at least in point on a non-Interactive sigma protocol with a Fiat-Shamir Transform and a specified elliptic curve, the zero-knowledge authentication information comprises one or more randomly generated integer of an order of the specified elliptical curve and a parameter derived at least in part from a one-way hash function of the one or more user secrets.

In one or more embodiments, one or more computing nodes are used to compute the zero-knowledge authentication information, wherein a first computing node of the one or more computing nodes accurately completing an algorithm to successfully record the zero-knowledge authentication information on the DL. The proof data may include one or more parameters for comparing the zero-knowledge authentication information recorded on the DL, the one or more parameters generated based at least in part on the user secret. The authenticity of the user is verified based at least in part on a server secret value received when the user initiated the second request.

In one or more embodiments, the DL transaction may include a transaction metadata, the zero-knowledge authentication information, and one or more extensions, wherein an extension is a minimum-security threshold. The zero-knowledge authentication information is generated at a user computing device.

In another embodiment, a computer system includes a computer processor to execute a set of program code instructions and a memory to hold the set of program code instructions, in which the set of program code instructions comprises program code to perform receiving a first request for generating a zero-knowledge authentication information from a user, generating a zero-knowledge authentication information with zero knowledge of a user secret, recording the zero-knowledge authentication information as a distributed ledger (DL) transaction on a distributed ledger (DL), authenticating the user using the zero-knowledge authentication information recorded on the DL and proof data received from the user, and providing user access upon determination the user is authenticated.

In one or more embodiments, the program code further performs receiving a transaction ID corresponding to the zero-knowledge authentication information recorded on the DL and registering the transaction ID corresponding to the user. Furthermore, the program code further performs receiving a proof data from the user as a second request to prove an identity of the user and verifying an authenticity of the user by retrieving the zero-knowledge authentication information from the DL corresponding to the user and comparing the proof data received from a computing device of the user and the zero-knowledge authentication information retrieved.

In one or more embodiments, the first request includes a userid uniquely identifying the user; and one or more user secrets, wherein a user secret is a privately held reproducible digital information that is reproducible by the user. The zero-knowledge authentication information is generated based at least in point on a non-interactive sigma protocol with a Fiat-Shamir Transform and a specified elliptic curve, wherein the zero-knowledge authentication information comprises one or more randomly generated integer of an order of the specified elliptical curve and a parameter derived at least in part from a one-way hash function of the one or more user secrets.

In one or more embodiments, one or more computing nodes are used to compute the zero-knowledge authentication information, wherein a first computing node of the one or more computing nodes accurately completing an algorithm to successfully record the zero-knowledge authentication information on the DL. The proof data includes one or more parameters for comparing the zero-knowledge authentication information recorded on the DL, the one or more parameters generated based at least in part on the user secret.

In one or more embodiments, the authenticity of the user is verified based at least in part on a server secret value received when the user initiated the second request. The DL transaction includes a transaction metadata, the zero-knowledge authentication information, and one or more extensions, wherein an extension is a minimum-security threshold. The zero-knowledge authentication information is generated at a user computing device.

In another embodiment, a computer program product embodied in a non-transitory computer readable medium, the non-transitory computer readable medium having stored thereon a sequence of instructions which, when executed by a processor causes the processor to execute a process, the process includes receiving a first request for generating a zero-knowledge authentication information from a user. The process also includes generating a zero-knowledge authentication information with zero knowledge of a user secret. The process further includes recording the zero-knowledge authentication information as a distributed ledger (DL) transaction on a distributed ledger (DL). Moreover, the process includes authenticating the user using the zero-knowledge authentication information recorded on the DL and proof data received from the user. Furthermore, the process includes providing user access upon determination the user is authenticated.

In one or more embodiments, the process may also include receiving a transaction ID corresponding to the zero-knowledge authentication information recorded on the DL. Furthermore, the process includes registering the transaction ID corresponding to the user. Moreover, the process includes receiving a proof data from the user as a second request to prove an identity of the user and verifying an authenticity of the user by retrieving the zero-knowledge authentication information from the DL corresponding to the user and comparing the proof data received from a computing device of the user and the zero-knowledge authentication information retrieved.

In one or more embodiments, the first request includes a userid uniquely identifying the user and one or more user secrets, wherein a user secret is a privately held reproducible digital information that is reproducible by the user. The zero-knowledge authentication information is generated based at least in point on a non-Interactive sigma protocol with a Fiat-Shamir Transform and a specified elliptic curve, the zero-knowledge authentication information comprises one or more randomly generated integer of an order of the specified elliptical curve and a parameter derived at least in part from a one-way hash function of the one or more user secrets.

In one or more embodiments, one or more computing nodes are used to compute the zero-knowledge authentication information, wherein a first computing node of the one or more computing nodes accurately completing an algorithm to successfully record the zero-knowledge authentication information on the DL. The proof data may include one or more parameters for comparing the zero-knowledge authentication information recorded on the DL, the one or more parameters generated based at least in part on the user secret. The authenticity of the user is verified based at least in part on a server secret value received when the user initiated the second request.

In one or more embodiments, the DL transaction may include a transaction metadata, the zero-knowledge authentication information, and one or more extensions, wherein an extension is a minimum-security threshold. The zero-knowledge authentication information is generated at a user computing device.

In another embodiment, a computer implemented method, includes identifying a first blockchain architecture. The method also includes identifying a second blockchain architecture. The method further includes maintaining a mapping structure, the mapping structure having a first column identifying a blockchain type, a second column identifying a pointer to a specific entry storing a zero-knowledge authentication information within a particular blockchain, wherein each row of the mapping structure correlates to a different authentication entry. Moreover, the method includes receiving a request for authentication of a user. Furthermore, the method includes querying the mapping table based at least in part on the UserID for transaction IDs storing one or more zero-knowledge authentication information associated to the user, the transaction IDs corresponding to at least one of the first blockchain architecture or the second blockchain architecture. Additionally, the method includes retrieving the one or more zero-knowledge authentication information from at least one of the first blockchain architecture or the second blockchain architecture using the transaction IDs.

Each of the individual embodiments described and illustrated herein has discrete components and features that may be readily separated from or combined with the components and features of any of the other several embodiments.

Further details of objects and advantages of the disclosure are described below in the detailed description, drawings, and claims. Both the foregoing general description and the following detailed description are exemplary and explanatory and are not intended to be limiting as to the scope of the disclosure.

BRIEF DESCRIPTION OF FIGURES

The drawings illustrate the design and utility of some embodiments of the present disclosure. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope. The invention will be described and explained with additional specificity and detail through the use of the accompanying drawings in which:

FIGS. 8A-8E illustrate various architectural system configurations for implementing various embodiments of the present disclosure.

DETAILED DESCRIPTION

Various embodiments will now be described in detail, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

Embodiments of the present disclosure disclose systems, computer programmable products, and methods for (1) registering user credentials as zero-knowledge authentication information (ZKAI) stored in a distributed ledger (DL) system instead of a centralized system; and (2) authenticating users using the ZKAI from the DL system and comparing the ZKAI with proof data provided by the user upon authentication. Storing cryptographic parameters of a secret user credential, such as a ZKAI on a distributed ledger for authenticating the user's credentials without a trusted execution environment allows the ZKAI to be stored in a distributed and non-centralized manner. The ZKAI, providing no knowledge of the actual secret user credentials, makes it practically impossible for a hacker/attacker to have any use for the ZKAI stored on the distributed ledger system, even if the ZKAI is publicly known.

Figure 1:
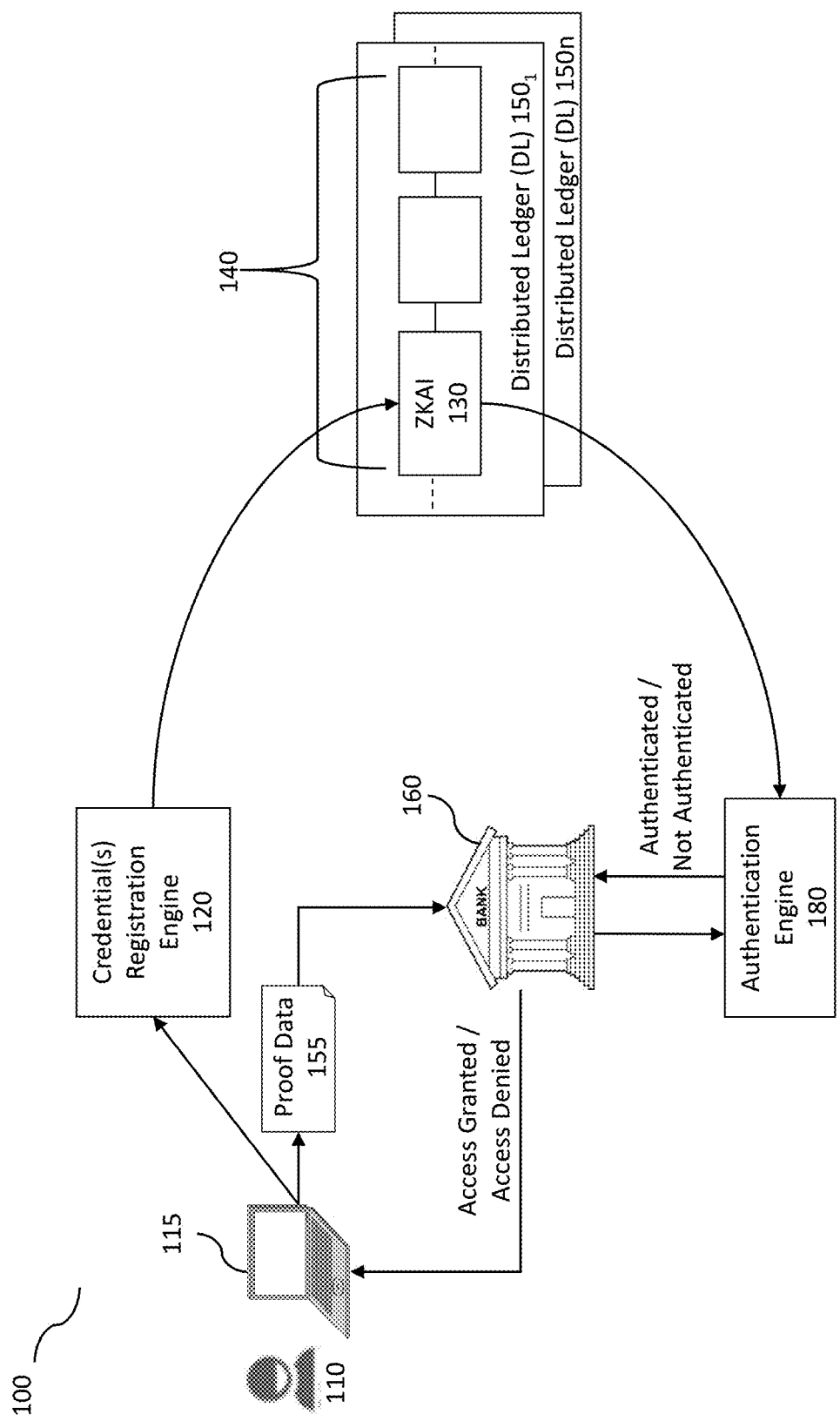
FIG. 1 illustrates a system for registering and implementing a user authentication, according to some embodiments of the disclosure.

FIG. 1 illustrates a system for registering and implementing a user authentication, according to some embodiments of the disclosure. System 100 illustrates a system for registering a user credential as a ZKAI and implementing a user authentication process with the ZKAI, according to some embodiments of the disclosure. System 100 may include a user 110, a user computing device 115, a credential registration engine 120, a distributed ledger (DL) 150 comprising a block chain data structure 140, the block chain data structure 140 comprising one or more blocks chained together, the one or more blocks corresponding to distributed ledger transactions. In the present embodiment, the one or more blocks may include ZKAI 130 stored within the one or more blocks for user 110.

System 100 may also include the user 110 making an authentication request via the user computing device 115 to an entity 160 by sending a proof data 155. The entity 160 may be communicatively coupled with an authentication engine 180. The authentication engine 180 may authenticate the user 110 by comparing a proof data 155 received from the user 110 and the ZKAI 130 corresponding to the user 110 received from the DL 150. Upon determination of a successful comparison where the user 110 is authenticated, the entity 160 may grant access to the user 110. Upon determination of a failed comparison, the entity 160 may issue a failure notice to the user 110 and deny access.

User 110 may be any user on the Internet or any user wanting to create a digital credential to uniquely identify the user 110 to other entities. User computing device 115 may comprise any type of computing station that may be used to operate or interface with the credential registration 120 and/or authentication engine 180. Examples of such user computing devices 115 include, for example, workstations, personal computers, laptop computers or remote computing terminals. User computing devices 115 may also comprise any type of portable tablet device, including for example, tablet computers, portable readers, etc. User computing device 115 may also include mobile telephone devices relating to any mobile device that can suitably access any computing systems, as an example, on the Internet such as smartphones and programmable mobile handsets. It is noted that the disclosure is not limited in its application to just these types of devices. The embodiments of the disclosure are applicable to any computing device that works in conjunction with access to digital information stored on, as an example, the Internet. One of ordinary skill in the art may appreciate embodiments of this present disclosure may be implemented on the Internet, on a closed network, on a hybrid open and closed network, or on a cloud network, etc.

The credential(s) registration engine 120 may perform user credential registrations with public and/or private distributed ledger(s) 150. Credential registration engine 120 may receive user requests for registering one or more zero-knowledge authentication information (ZKAI) 130 to be used to prove an identity of a user and/or to serve as a point of reference for a proof data 155 that the user may provide to an authentication engine 180 to prove the user possess a user secret corresponding to the ZKAI 130, and thus, authenticating the user.

A user secret may include any privately held, reproducible digital information. Common examples in use today are passwords, PINs, private cryptographic keys, biometrics, hardware security modules, and algorithmic identifiers (e.g. behavioral analysis). One of ordinary skill in the art may appreciate that this present disclosure extends to any information that upholds the aforementioned properties: reproducible from memory, via digital or physical process, or otherwise, and privately held, that is reproducible only by the creator. This disclosure does not define soundness of credential archetypes in order to maintain generality to undiscovered processes for secret generation. A user secret may also be referred herein to as an authentication secret or auth secret.

A purpose of a user secret in the present disclosure is the same as in traditional authentication. A user secret is the logical equivalent and might take the literal form of a symmetric cryptographic key. The user secret may be provided as input to a zero-knowledge proof of knowledge generation protocol. The resulting proof data allows the user to prove knowledge of the secret without revealing the secret to an authenticator. This process forms the foundation of "trustless" authentication, that is validating a credential where 3rd party participating entities (i.e. devices, servers, individuals, institutions, etc.) need not be trusted.

In some embodiments, weak user secrets/credentials such as short PINs may be optionally transformed into less predictable keys that cannot be guessed by an adversary, via brute-force or otherwise, in a reasonable amount of time. This is commonly referred to as key stretching. While not strictly necessary to achieve the functionalities disclosed herein, an embodiment that neglects this step may be considered weaker than existing solutions which implements key stretching.

Credential registration engine 120 may (1) generate a ZKAI 130 based on input provided by the user 110 and the user computing device 115 and (2) append the ZKAI 130 to the distributed ledger 150, the ZKAI 130 representing a public version of the user secret without providing any information for any attacker/hacker to derive the user secret. In some embodiments, the ZKAI 130 may be generated by the user computing device, in which case, the credential registration engine may receive the ZKAI 130 from the user computing device of the user. In some embodiments, a credential registration engine 120 may be an engine executed by a vendor, such as a bank, an online retail store, etc. In some embodiments, the credential registration engine 120 may be an engine executed by a service provider operating, as an example, an Ethereum node for registering user credentials on an Ethereum distributed ledger 1501 as ZKAI 130. In yet another embodiment, credential registration engine 120 may be an engine executed by a user computing device 115 operating as a service provider on an Ethereum node, registering user credentials on an Ethereum distributed ledger system 1501 as ZKAI 130. One of ordinary skill in the art may appreciate the credential registration engine 120 may be executed/implemented on a variety of different computing devices and that the computing devices disclosed herein are simply illustrative examples of computing devices that may execute/implement the credential registration engine 120.

Traditional symmetric authentication is performed by transmitting a typically obscured (i.e. hashed, stretched, or encrypted) password to an authenticator, where the obscured password is compared to a previously registered value in a database. In the context of zero-knowledge proofs and in the remainder of the present disclosure, the user may be referred hereinafter as the prover (e.g., someone trying to prove to another person such as an authenticator or verifier that the prover knows the secret but cannot outright reveal the secret) and the authenticator and/or entity 160 may be referred hereinafter as the verifier.

ZKAI 130, in an authentication setting, is a data structure that do not expose private information such as prover knowledge, obscured or otherwise, to the verifier at any point in the exchange. Instead, the verifier is aware of publicly known parameters (e.g., ZKAI 130), and receives further input generated by the prover during authentication that is the proof itself. The verifier need only compute and compare terms defined by a governing zero-knowledge protocol to validate that the user produced the correct secret. In a well-formed exchange, it is computationally infeasible for the verifier to reconstruct the secret from the proof data received or the publicly known parameters.

It should be noted that even in isolation, ZKAIs may be leveraged to reduce the liability of securing user credentials that falls on modern digital services and institutions. The inventive systems and approaches in the present disclosure are the combination of (1) zero knowledge proofs of knowledge (e.g., ZKAI), zero-knowledge succinct non-interactive arguments of knowledge (zkSNARKS), and more generally, the genus of cryptographic protocols that verify but do not reveal secret information with (2) a storage facility that is tamper-resistant, immutable, and publicly accessible within the given network scope, such as, for example a distributed ledger (e.g. an Ethereum blockchain, Bitcoin blockchain, etc.). The distributed ledger may be such a system for enabling users to be the sole proprietors of credentials, rather than service providers as commonly found in existing traditional systems, while still allowing the parties (e.g., user-to-user, user-to-vendor, vendor-to-vender, users, vendors, and/or service providers, etc.) to conduct secure digital interactions.

Such systems and approaches form the foundation for inventive, decentralized and user-moderated methods for sought-after use-cases, achieved today via heavily centralized servers and service providers with large "honey pots" of user credentials and data that serve as targets for attackers. Examples of use-cases include but are not limited to context-agnostic (i.e. web, desktop, mobile, embedded, physical, etc.) authentication, data encryption and secure transmission, and identity management both as a well-established enterprise tool and public utility.

ZKAI 130 may include one or more publicly known parameters corresponding to a user secret. The publicly known parameters may include, as an example, (A) or (r1, r2, and c) as disclosed further below, that at one point in time may include some form of the user secret In one embodiment, ZKAI 130 may include one or more randomly generated integer of an order of the elliptical curve and a parameter derived at least in part from a one-way hash function of the one or more user secrets as disclosed below.

It is important to note that the ZKAI 130 that is stored on the DL 150 is different from simply storing a public key, which has a corresponding private key. The ZKAI 130 may be a zero-knowledge proof of knowledge that was generated from a user secret (e.g., a private key) such that the ZKAI 130 (e.g., a public key) was derived from the user secret (e.g., a private key)—as opposed to two large keys, each randomly generated and not derived from one another, but instead joined together upon creation of the public/private key generation. Thus, the ZKAI 130 should not be confused with a public key. In some embodiments, a user may use a PKI as a user secret such that the resulting ZKAI 130 is also derived from the user secret, even though the user secret is a PKI.

Distributed ledger (DL)150, (often may be referred to as a shared ledger, or distributed ledger technology (DLT) by one of ordinary skill in the art), is a consensus of replicated, shared, and synchronized digital data geographically spread across multiple sites, countries, or institutions. There is no central administrator or centralized data storage. A peer-to-peer network may be used to manage a distributed ledger as well as consensus algorithms to ensure replication across nodes is undertaken. In some embodiments, a distributed ledger design may include a blockchain, which may be either public or private, according to some embodiments.

Not all distributed ledgers have to necessarily employ a chain of blocks 140 to successfully provide secure and valid achievement of distributed consensus. One of ordinary skill in the art may appreciate a blockchain system may be one type of data structure considered to be a distributed ledger. In other embodiments, other types of data structure may be employed in a distributed ledger. DLs 150 allow tamper-resistant, immutable storage of and unrestricted access to the uniquely identifiable public verifier knowledge (e.g., ZKAI 130), enabling trustless authentication with user-owned credentials.

A block within the blockchain 140 may include a ZKAI 130. A blockchain data structure is further discussed below. In some embodiments, different types of distributed ledgers 150 (e.g., distributed ledger $150_1$, distributed ledger $150_2$ ... distributed ledger $150n$) may be used to store the ZKAI 130. In some embodiments, multiple types of distributed ledgers 150 may be used and a specific mapping structure (not shown in FIG. 1, but shown in FIG. 9 discussed below) may be maintained to reference PKAIs 130 stored across the different types of distributed ledgers 150. In some embodiments, the publicly known parameters (e.g., ZKAI 130) may be stored in a database instead of a distributed ledger.

Proof data 155 may be a proof of knowledge that the user computing device 115 generates based on input provided by the user 110. As an example, the user 110 may navigate to a login page of an entity 160 to initiate the authentication process. In one embodiment, the user may input a transaction ID and a user secret associated to the ZKAI stored at a DL corresponding to the transaction ID. However, to avoid the user 110 having to memorize or store transaction IDs, some embodiments may include a mapping structure that maintains a mapping between a UserID (e.g., a username) and the transaction ID. The login page of the entity 160, running on the user computing device 115 may receiving user inputs to generate a proof 155 from the entered UserID and user secret to send to entity 160 to initiate the authentication process.

Entity 160 may be any entity that a user 110 has a relationship with or would like to establish a relationship with that may require the user 110 to prove his/her/its identity before consuming its products, services, and/or information (e.g., to prove to entity 160 that the user possess a proof of knowledge that corresponds to a ZKAI 130 that only the true user could possess the knowledge). Examples of such entities may be any vendor such as any business or person that provides a service, a product, and/or information to the user that may need to verify the identity of the user before providing the service, product and/or information. A vendor may be, as depicted as an example in FIG. 1, a bank, a retailer, a travel company, an insurance company, a social media site, a user credential management provider, an information provider, etc. Furthermore, an entity 160 may also be another person who may not know the user 110 but needs to prove the identity of the user 110. For example, user 110 may want to prove his/her/its identity with another person, entity 160 so that entity 160 may feel relatively confident/sure that user 110 is who user 110 claims to be.

Authentication engine 180 performs processing to verify whether or not a user actually is who the user claims to be. For example, someone trying to prove (e.g., a prover) to another person (e.g., a verifier such as an entity 160) that the prover knows the secret but cannot outright reveal the secret. As discussed above, zero-knowledge proofs of knowledge (ZKPoK) in an authentication setting do not expose private information that is prover knowledge, obscured or otherwise, to the verifier at any point in the exchange. Instead, the verifier is aware of publicly known parameters (e.g., ZKAI 130), and receives further input generated by the prover during authentication that is the proof itself.

The authentication engine 180 computes and compares terms defined by a governing zero-knowledge protocol to validate that the user produced the correct secret. In a well-formed exchange, it is computationally infeasible for the verifier to reconstruct the secret from the proof received or the publicly known parameters. The authentication engine 180 may return as a result whether or not the proof data 155 provided by a user 110 successfully computes with the publicly known parameters corresponding to the user's proof. In some embodiments, the authentication engine 180 may be implemented by one or more entities 160 and/or by a service provider providing, as an example, user credential, user authentication and data management services.

Figure 2:
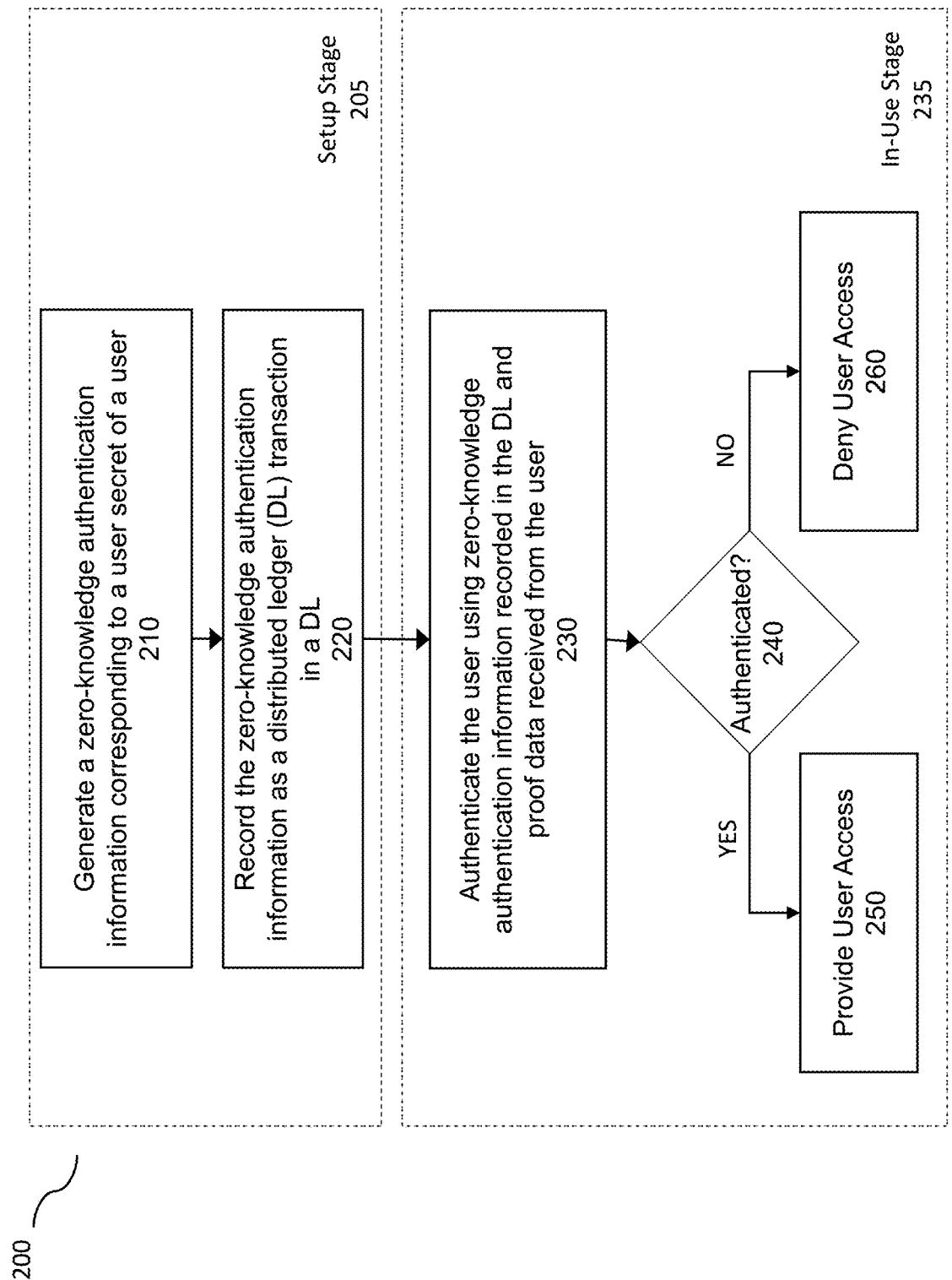
FIG. 2 shows a flowchart of an approach to register and implement a user authentication, according to some embodiments of the disclosure.

FIG. 2 shows a flowchart of an approach of a method to register and implement a user authentication, according to some embodiments of the disclosure. Method 200 includes a set up stage 205 and an in-use stage 235. The setup stage 205 depicts a method for setting up the ZKAI 130 in a way that it may be accessed in the future for authentication purposes as shown in the in-use stage 235 disclosed below. The setup stage 205 starts with a user device sending a request to register a user secret corresponding to a user of the user device.

At 210, a ZKAI 130 having publicly known parameters may be generated corresponding to the user secret of the user. The ZKAI may be a public version of the user secret corresponding to the user secret of the user that the publicly known parameters of the user secret cannot be reverse engineered (e.g., calculated or computed) to derive the user secret.

The methods disclosed below (e.g., Approach #1 and Approach #2) disclose two examples of how a prover may prove to a verifier that the prover possesses the user secret, thus proving to the verifier that the prover is who he/she claims to be. First, the prover must first create one or more publicly known parameters (e.g., ZKAI, public version of a user's secret, key fragments, etc.) from at least a user's secret and register the one or more publicly known parameters with a distributed ledger. The publicly known parameters being generated by an algorithm that makes it practically impossible to reverse engineer (e.g., calculate) using only the publicly known parameters to determine the user's secret used to generate the publicly known parameters.

But, the publicly known parameters providing enough information as reference points such that when the prover provides a proof of knowledge (e.g., proof data 155) that is applied to the publicly known parameters, the comparison and/or computation results in a successful value indicating the prover does in fact possess the user secret that was used to generate the publicly known parameters and the proof data to apply to the publicly known parameters to prove that the prover possess the user secret. In other words, it would take some astronomical odds for a pretender to generate a proof of knowledge (e.g., proof data 155) that when applied to the publicly known parameters, the comparison and/or computation performs on the proof data 155 using the publicly known parameters results in a successful value indicating the proof data 155 checks out with the publicly known parameters. The only way the pretender would have been able to generate a proof data 155 that would result in a success is if the pretender had knowledge of the user secret.

Approach #1

An illustrative example is provided below that should not limit the embodiments disclosed herein to the scope of non-interactive zero-knowledge sigma protocols for proofs of knowledge nor to the cryptographic foundation of elliptic curves. Many protocols exist for generating zero-knowledge proofs of knowledge that uphold the properties illustrated in this example, and zero-knowledge protocols are an increasingly popular research topic. Similarly, cryptographic primitives progress rapidly. One of ordinary skill in the art may appreciate that the disclosed methods extend to the mechanism achieved by zero-knowledge proofs of knowledge in general, and that the desirable mathematical properties of elliptic curves have already been found in other constructions (e.g. lattice-based approaches). This will only grow more pronounced as quantum computing enters mainstream adoption.

Interactive proofs may require back-and-forth messages sent between the verifier and prover. In a non-interactive proof, the prover generates a single message (called the "proof") that the verifier may check the proof directly without requiring any further back-and-forth messages being sent between the prover and the verifier.

The process depicted below provides an embodiment of an approach for generating a zero-knowledge authentication information (ZKAI). First, the user secret, a, is produced by the prover. For purposes of this illustration, a, is assumed to be sufficiently strong. The prover's device or a service provider's device (e.g., a credential registration engine) may generate:

$$A=a*G \qquad (1)$$

It should be noted that the elliptic curve point multiplication (e.g., the *) by a scalar (as performed to compute A) is a one-way function, that is, it is computationally infeasible to reconstruct a, the user secret, from A and G. G is a generator or base point of an elliptical curve which is already a public item. A (e.g., ZKAI), in this example, may be treated as a publicly known parameter that may be appended to a distributed ledger transaction. A, or the publicly known parameter, is useless to anyone who cannot produce the user secret a. In other words, A may be referred to as a publicly known parameter which may further be referred to, as examples, ZKAI, a public version of a user's secret, a key fragment, etc. The user secret a never leaves the user's device or persists anywhere on the user's device or any other device(s). The user secret a may be provided by the prover upon authentication to generate a string of computations of a set of factors generated from the following formula below.

The process depicted below provides an embodiment of an approach of a subsequent authentication exchange for authenticating the user with a verifier. To begin the authentication process, the prover must first generate (R, s), which are the secret parameters produced by the prover without ever revealing the actual user secret a to a verifier. (R, s) may be referred to, in this example, as a proof of knowledge (e.g., proof data 155). The prover must generate (R, s) by:

$$r:=0 \leq \text{randomInteger} < \text{order} \qquad (2)$$

$$R:=r*G \qquad (3)$$

$$c:=\text{Hash}(R) \qquad (4)$$

$$s:=r+c*a \bmod p \qquad (5)$$

$$(R,)\Rightarrow \text{verifier} \qquad (6)$$

It should be noted that r is a random integer generated from order that is a specific public parameter of an order of an elliptic curve that is chosen for this embodiment. R is a blinding factor of a commitment that is obtained by taking the random integer r and obscuring the r in a similar process used to generate A above. c is a hashing of the R to generate a one-way string representation of the random integer r that is being used as a commitment factor. s is the critical point that is actually used by a verifier to compare secret parameters sent by the user (e.g., R, s) with the ZKAI received from the distributed ledger corresponding to the user. It should also be noted that the security affordance of the resulting curve is tied strongly to the selection of these and other parameters, and an embodiment that doesn't use a secure parameterization may be vulnerable.

(R, s) are the proof of knowledge (e.g., proof data) sent to the verifier, which computes an equality check:

$$c:=\text{Hash}(R) \quad (7)$$

$$s*G =? + c*A \quad (8)$$

The verifier may first generate c by hashing (R). Then the verifier may plug c into the comparison equation to determine whether or not the two sides of the equation result in a successful equality check. The result of the equality check may be passed along to the requesting party as the result of the authentication attempt.

Approach #2

Another illustrative example is provided below that should also not limit the embodiments disclosed herein to the scope of non-interactive zero-knowledge sigma protocols for proofs of knowledge nor to the cryptographic foundation of elliptic curves. The formulas depicted below provide an embodiment of an approach for generating a ZKAI corresponding to a user secret. First, the user secret, a, is produced by the prover. For purposes of this illustration, a, is assumed to be sufficiently strong. Then the prover's device or a service provider's device (e.g., a credential registration engine) may generate r1, r2, and c as the publicly known parameters (e.g., ZKAI) to be appended to a distributed ledger. The following process illustrate the generation steps of the ZKAI comprising publicly known parameters (r1, r2 and c):

$$r1:=\text{randorder} \quad (i)$$

$$r2:=\text{randorder} \quad (ii)$$

$$a':=H(a) \quad (iii)$$

$$A:=a'*G \quad (iv)$$

$$RA:=A*r2 \quad (v)$$

$$R1:=r1*G \quad (vi)$$

$$R2:=r2*G \quad (vii)$$

$$c:=(RA+R1+R2) \quad (viii)$$

$$(r1, r2, c) => \text{Ledger} \quad (ix)$$

The registration system may receive the user secret a, calls an initialize function that returns r1, r2, and c, which are the commitment variables/publicly known parameters/ZKAI that may be appended to the DL. In some embodiments, r1 and r2 may be two independent salts that are ultimately unimportant in that they both contain non-sensitive randomly generated values. A salt is random data that is used as an additional input to a one-way function that "hashes" data, a password or passphrase, etc. Salts are closely related to the concept of nonce. The primary function of salts is to defend against dictionary attacks or against its hashed equivalent, such as a pre-computed rainbow table attack. In some embodiments, r1 may be an independent randomly generated value and r2 may be a private key or a digitally derived value of a private key to couple two factors together within one user secret. In some embodiments, as discussed below, multi-factor authentication may be implemented by multiple user secrets where in each user secret is associated to a transaction.

a' may be a hash of a such that A is similarly derived as A from Approach #1 above, only that A here is based on a hashed result of the user secret a. As discussed above, it should be noted that the elliptic curve point multiplication (e.g., the *) by a scalar (as performed to compute A) is a one-way function, that is, it is computationally infeasible to reconstruct a', the hashed user secret a, from a' and G. RA is generated from A*r2. R1 is generated from r*G. R2 is generated from r2*G. c is generated from a Hash of (RA+R1+R2). c is ultimately the one reference point that may be available to the verifier to authenticate a user's identity. Although r1, r2 and c are available on the public distributed ledger, r1 and r2 are non-sensitive random values operating as salts, whereas c is a publicly known parameter generated from a Hash of (RA+R1+R2).

(r1, r2, and c) (e.g., ZKAI 130) may be written to the distributed ledger. The goal is to publish as little information on the distributed ledger as possible but to still provide a reference point for authentication. r1 and r2 are on the ledger because this proof data includes a secret server b value to make every proof data issued by the user unique and have some management of how long the proof data may be active. In some embodiments r2 may not be a random value, but instead, a second user secret that a user may want to produce each time the user wants to be authenticated to create a multi-factor authentication capability for the one DL transaction.

The formulas depicted below provides an embodiment of an approach of a subsequent authentication exchange for authenticating the user with a verifier. To begin the authentication process, the prover must first generate the proof data comprising (A, C, s1, s2, b), which may be the secret parameters produced by the user/prover without ever revealing the actual user secret a to a verifier. The prover device must generate the proof data (A, C, s1, s2, b) by taking as inputs:

User Secret, a (x)

Server secret, b (xi)

Ledger Info, (r1, r2, c) (xii)

Prime order of curve, n (xii)

User secret a is the user secret used by the user when registering the user's credential. Server secret b is a key generated by a server trying to authenticate the user.

Server secret b is a second ZKPoK parameter that is generated by the server that ties server secret b to a user's proof of a such that the server receives a ZKPoK that proves knowledge of both a and b without revealing them (e.g., "in zero-knowledge"). Server secret b allows each authentication proof data to be unique and scoped to the authentication attempt in progress (with a time-to-live based on b). It is not necessarily required to prove knowledge of b as part of the zero-knowledge protocol, and in fact it in some ways overlaps HTTPS. But having a secret server value b parameter also affords an easy dial on the authentication attempt duration, and is further trustless, stateless tamper resistance. This statelessness is so that no server needs to maintain b between the authentication requests (e.g., the actual HTTPS requests) in a shared memory/data base. Servers can fire and forget b by only maintaining a set of N number of random keys, where N is much, much less than a total number of active authentication attempts and is rotated periodically.

Having a server generate a secret server value (e.g., b) saves a lot of effort on the part of the underlying servers, which don't need to maintain and share a massive number of b's. In other embodiments, one of ordinary skill in the art may deploy a complex distributed caching mechanism to share all b's across all servers, but this inherently limits scale, no matter how advanced the distribution mechanism is. However, it also doesn't push that state maintenance to the load balancer (another common implementation), which still needs only direct requests from the same origin to a consistent underlying server, which is natural operation (or at the very least supported) for most load balancer implementations.

(xii) Ledger Info, (r1, r2, c), are received from the DL. Ledger Info (r1, r2, c) is the ZKAI that was generated for the user upon registration of the one or more user secrets as discussed above.

A generation of the proof data by the prover device begins once all of the inputs are available. The following steps illustrate the generation of the proof data having the parameters of (A, C, s1, s2, b), according to this embodiment:

$$C:=(a*(b+3))*G \tag{xiii}$$

$$A:=a*G \tag{xiv}$$

$$RA:=A*r2 \tag{xv}$$

$$R1:=r1*G \tag{xvi}$$

$$R2:=r2*G \tag{xvii}$$

$$c:=(RA+R1+R2) \tag{xviii}$$

$$s1:=(r1+c*a) \bmod n \tag{xix}$$

$$s2:=(r2+c*b) \bmod n \tag{xx}$$

$$(A, C, s1, s2, b) => \text{Verifier/Authenticator/Server} \tag{xxi}$$

At (xiii), C may be generated by $(a*(b+3))*G$, where a is the user secret provided by the user, b is the server secret value received from the authenticating server and G is a generator or base point of an elliptic curve which is already a public item, as discussed above. C may function as a reference of a and b, which ties a to b. C may also serves as purposeful noise, where the noise makes it harder for brute force attacks and purposeful in that C serves as a reference point of a and b. It is important that the user secret provided by the user is not saved on any storage device on the client device. The user secret may be produced by the user upon a request to authenticate the user, but that request takes place on a user client device so that user's secret is never sent to any server, only the proof data generated as a result from the user's secret.

At (xiv), A is generated similarly as in Approach #1, e.g., as the elliptic curve point multiplication (e.g., the *) by a scalar (as performed to compute A) being a one-way function, that is, it is computationally infeasible to reconstruct a, the user secret, from A and G, where G is a generator or base point of an elliptic curve which is already a public item. At (xv), RA is generated using A and r2. Similarly, R1 and R2 are generated similar to A, except instead of $a*G$, it is r1 and $r2*G$ respectively for R1 and R2. c is generated by taking a hash of RA+R1+R2. s1 is generated by $(r1+c*a)$ mod n, while s2 is generated by $(r2+c*b)$ mod n. Once the proof data is generated, the proof data having (A, C, s1, s2, b) is sent to the verifier/authenticator server for authentication.

As discussed above, providing this proof data to the verifier, as opposed to the user's secret, is important because, the user is still able to provide a proof of identification of the user to a verifier to authenticate, based on a ZKAI registered in the DL. The proof data provided by the user to the verifier does not contain user secret information that may be determined by the verifier. Only that once the verifier compares the proof data sent by the user's device against the ZKAI received from the DL, the verifier may be able to determine whether (1) the proof data is authenticated and checks out or (2) the proof data is not authenticated and does not check out.

(A, C, s1, s2, b) are the secret parameters (e.g., proof data 155) sent to the verifier, the verifier takes as input:

$$\text{Proof/Prover Knowledge, } (A, C, s1, s2, b) \tag{xxii}$$

$$\text{Ledger Info, } (r1, r2, c) \tag{xxiii}$$

The verifier performs an equality check:

$$B:=b*G \tag{xxiv}$$

$$RA:=A*r2 \tag{xxv}$$

$$R1:=r1*G \tag{xxvi}$$

$$R2:=r2*G \tag{xxvii}$$

$$s1*?=R1+c*A \tag{xxviii}$$

$$s2*?=R2+c*B \tag{xxix}$$

$$s2*?=RA+c*(C-3*A) \tag{xxx}$$

The verifier, at (xxiv) first generates B by $b*G$. Again, it is important to note that the server secret value b provides the ability for the entire process to ensure (1) the proof data provided by the user is unique and (2) the proof data provided by the user is still active within an active time frame. This allows the process to maintain a stateless, trustless systems and methods for authenticating the user. At (xxv) RA is generated by $A*r2$. At (xxvi) and (xxvii), R1 and R2 respectively are generated by $r1*G$ and $r2*G$. Finally, comparison computations are performed at (xxviii)-(xxx). If all of the equality checks are successful, the verifier will issue a successful authentication. However, if a single equality check does not check out, the system may fail the authentication.

At 220, the ZKAI may be recorded/registered/appended as a distributed ledger (DL) transaction in a DL. Storing the ZKAI in a DL allows a public version of the user secret to be stored in a distributed and trustless manner. In some embodiments, the distributed ledger may be a trusted distributed ledger, wherein only certain trusted entities may access and/or manage information contained within the distributed ledger.

A user may want to get authenticated/verified by providing a proof data, without revealing the user secret, that the user possesses knowledge of the user secret that corresponds to the ZKAI stored on the DL. At 230, the user may be authenticated using the ZKAI stored in the DL and proof data received from the user. If it is determined that the user provided adequate proof that the user is in fact in possession of the user secret corresponding to the ZKAI, then an "authenticated" indicator may be sent (e.g., to an entity 160) so that at 250, the user may be provided access to services/information/data that an authenticated user is allowed to consume. However, if the user does not provide adequate proof that the user is in fact in possession of the user secret (e.g., the comparison of the proof data provided by the user against the public version of the user secret), then a "not authenticated" indicator may be sent (e.g., to the entity 160) so that at 260, the user is denied access.

Figure 3:
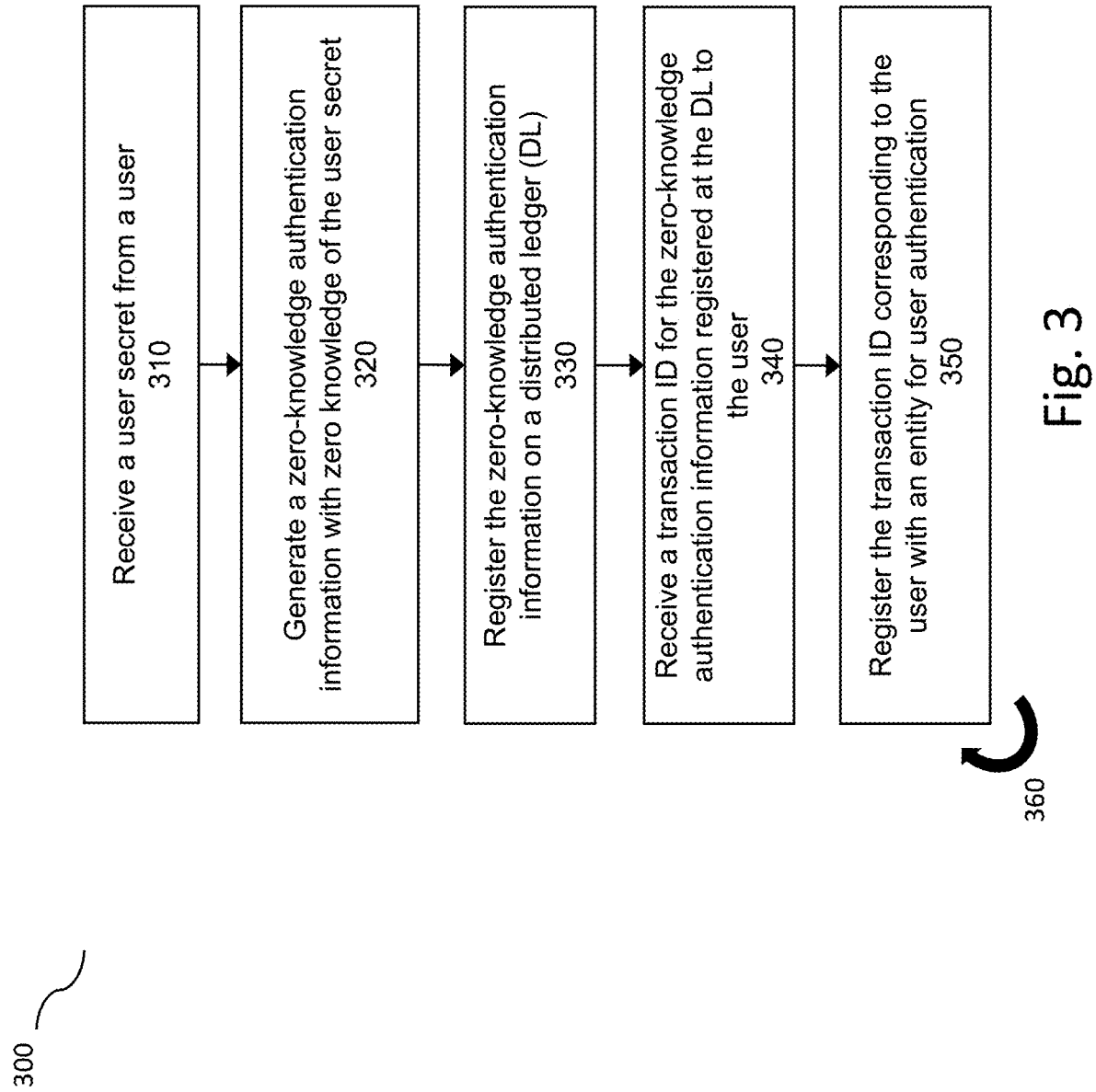
FIG. 3 illustrates an example of an approach for registering a user credential, according to some embodiments of the disclosure.

FIG. 3 illustrates an example of an approach for registering a user credential, according to some embodiments of the disclosure. Method 300 illustrates an example of an approach for registering user credential(s) (e.g., publicly known parameters) for user authentication. At 310, a user secret is received from a user. The user secret may include a username to uniquely identify the user along with the user secret (e.g., a password, a fingerprint, etc.). In some embodiments, a user may register a plurality of user secrets to uniquely identify the user. For example, a user secret may include a password. Another user secret may include a combination of a password and a fingerprint. Another user secret may include a combination of a password, two fingerprints and a text phrase, etc. In some embodiments, the multiple user secrets may be coupled together as a single transaction. In some embodiments, the multiple user secrets may be stored and used as individual transactions.

At step 320, the user secret is immediately generated into a ZKAI upon input of the user secret into the user computing device 115 such that the user secret is never saved to any persistent or non-persistent storage medium. Additionally, the ZKAI is generated such that the user secret cannot be derived from the ZKAI. In some embodiments, the ZKAI may be generated using a non-interactive sigma protocol with Fiat-Shamir transform and an elliptic curve via, as an example, Approach #1 or Approach #2, as discussed above. One of ordinary skill in the art may appreciate there are other ways to generate the ZKAI and that Approach #1 and Approach #2 are examples of different approaches to generating the ZKAI. In some embodiments, the ZKAI may be generated on the user computing device. In other embodiments, the ZKAI may be generated at another computing device.

At 330, the ZKAI is registered on a distributed ledger. One of ordinary skill in the art may appreciate that the registration of the ZKAI onto a blockchain of a DL in effect makes the ZKAI immutable and distributed (e.g., not centralized). In some embodiments, the ZKAI may be registered on one or more different types of DL such as, as an example, an Ethereum blockchain, a Bitcoin blockchain, or any public or proprietary blockchain.

At 340, a transaction ID of the DL transaction comprising the ZKAI registered at the DL is received. The transaction ID uniquely identifies the DL transaction corresponding to the user and the ZKAI stored within the DL. In some embodiments, a user may register a plurality of user secret to uniquely identify the user. Each user secret registered generates a transaction ID uniquely identifying the ZKAI. For example, if a user registers three separate user secrets, then the user will receive three separate transaction IDs, one for each user secret registered with the DL.

At 350, the transaction ID of the DL corresponding to the user is registered with an entity (e.g., entity 160) for user subsequent/future authentication. The entity may be, as an example, a bank where the user may want to establish a financial relationship, such as a bank account. In order to register the recently registered transaction ID with the bank, the bank must first verify the identity of the user. For example, if the user already has a previously verified/authenticated transaction ID registered with the bank, the bank may leverage the previously verified transaction ID to authenticate the user using the previously verified transaction ID. Upon a successful authentication of the previous transaction ID, the bank now is assured the user is who the user claims to be and would register the new transaction ID with the user.

However, if this registration of the new transaction ID is the first time the user establishes a relationship with the bank, the user may have to provide verification of identification of the user before the bank would register the transaction ID to the user since at this point in time, the bank does not know who the user is due to a lack of prior relationship. One approach may include the user physically going to the bank to provide physical identification documents (e.g., a driver's license, a social security card number, etc.) to prove identity. Once the bank is satisfied the user is who the user claims to be, the bank may then register the transaction ID with the user. Another approach may include the bank verifying the identity of the user via a trusted service provider who may already have a verified/authenticated transaction ID associated to the user and thus using the trusted service provider to authenticate the user via the previously verified transaction ID the user has previously registered with the service provider. Upon confirmation by the service provider that the user is who the user claims to be, the bank may at that point register the transaction ID of the user with the bank.

Upon registering the transaction ID with the bank, the bank may now be able to associate the user with the transaction ID such that when the user is requesting authentication using a particular proof data provided by the user, the authentication engine may be able to perform a mapping to identify the transaction ID on the DL that contains the ZKAI to compare against the proof data 155 provided by the user computing device of the user. In some embodiments, the entity may be another person for whom the prover is seeking to prove that the prover is who the prover alleges to be. Yet, in some embodiments, the entity may be a service provider that assists and manages user authentication for entities not wanting to manage, as an example, an Ethereum node for registering ZKAI.

At 360, in some embodiments, step 350 may be used multiple times for at least two separate purposes. A first purpose may be to register the transaction ID multiple times at different banks. A second purpose may be to register multiple times at the same bank to change a password (e.g., use a new transaction ID) or add another way of authenticating if the user would like to use multi-factor authentication. For example, the user may want to establish a multi-factor authentication to further enhance security by registering multiple transaction IDs corresponding to multiple user secrets registered on the DL. For example, the user may have registered three separate user secrets, thus possessing three different transaction IDs. Upon registering the transaction ID(s) with the entity for authentication (e.g., at step 350), the user may register three transaction IDs with the entity such that for this particular user authentication, the user must provide proof data that the user possesses three separate user secrets corresponding to three separate ZKAI before a successful authentication may be generated for the user. Since the bank have already been able to authenticate the user based on a previously stored transaction ID, adding new transaction IDs to the user's profile is much simpler.

In one embodiment, the multi-factor authentication may be implemented as a user registering three separate user secrets and receiving three separate transaction IDs. In another embodiment, the user may register one user secret having three separate user secrets included within the one user secret being registered (e.g., r2 as discussed above). One of ordinary skill in the art may appreciate the approaches disclosed in this disclosure may have multiple use cases and that the disclosed use cases are mere examples of different types of use cases for implementing a multi-factor authentication process.

In another embodiment, as an example, if the user wishes to change a password since the ZKAI is stored on an immutable blockchain, the user may have to register a new ZKAI with a DL and thus will receive a transaction ID, the user may register the new transaction ID with the bank since the bank may be able to verify the user using previous transaction ID already established with the bank, the bank may register the new transaction ID and disable the previous transaction ID from access since the previous transaction ID is no longer used by the user.

Figure 4:
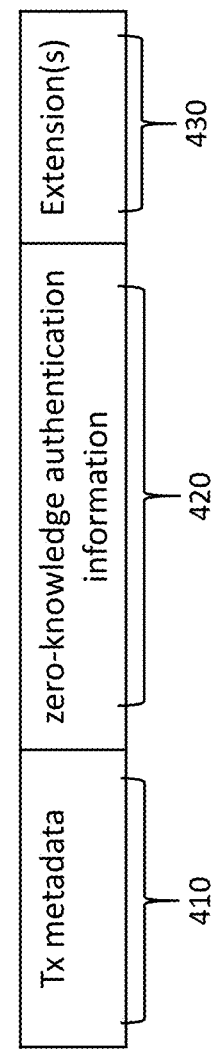
FIG. 4 illustrates an illustrative example data structure of a distributed ledger transaction for registering user credentials, according to some embodiments of the disclosure.

FIG. 4 illustrates an illustrative example data structure of a distributed ledger transaction for registering user credentials, according to some embodiments of the disclosure. The distributed ledger transaction data structure 400 may include a transaction (Tx) metadata 410, a ZKAI 420, and one or more extensions 430). The Tx metadata 410 may be a transaction metadata structure for storing metadata relating to the distributed ledger transaction that is stored on the distributed ledger. In some embodiments, the Tx metadata 410 may include arbitrary data corresponding to the transaction. In some embodiments, Tx metadata 410 may include at least one of the following fields:

a "Nonce"—the number of transactions sent from the sending address; a "gasPrice"—the rate the sender is willing to pay for processing, incentivizes miners to process the transaction, ultimately appending it to the ledger; a "gasLimit"—the maximum quantity of gas the sender is willing to pay for processing this transaction; a "to"—destination address; a "value"—quantity of ether to be sent to the destination address; a "data"—arbitrary length binary data, (e.g., A+extensions or r1, r2, c+extensions, according to some embodiments); a "r"—an Elliptic Curve Digital Signature Algorithm (ECDSA) parameter, produced in signing the above fields; a "v"—ECDSA parameter, produced in signing the above fields; or a "s"—ECDSA parameter, produced in signing the above fields.

The zero-knowledge authentication information 420 may be the ZKAI produced by, as an example, Approach #1 or Approach #2 or any other zero knowledge proof or zero-knowledge proof of knowledge type of method that generates a ZKAI to be appended to, as an example, a distributed ledger system. One of ordinary skill in the art may appreciate the ZKAI may be stored in any storage readable medium for any of the embodiments disclosed herein. A distributed ledger system is disclosed purely as an example of embodiments of the present disclosure.

The extensions 430 are optional and maybe appended to, as an example, the data field in, as an example, an Ethereum blockchain. Embodiments of such extensions underlying advanced authentication capabilities are disclosed below.

Figure 5A:
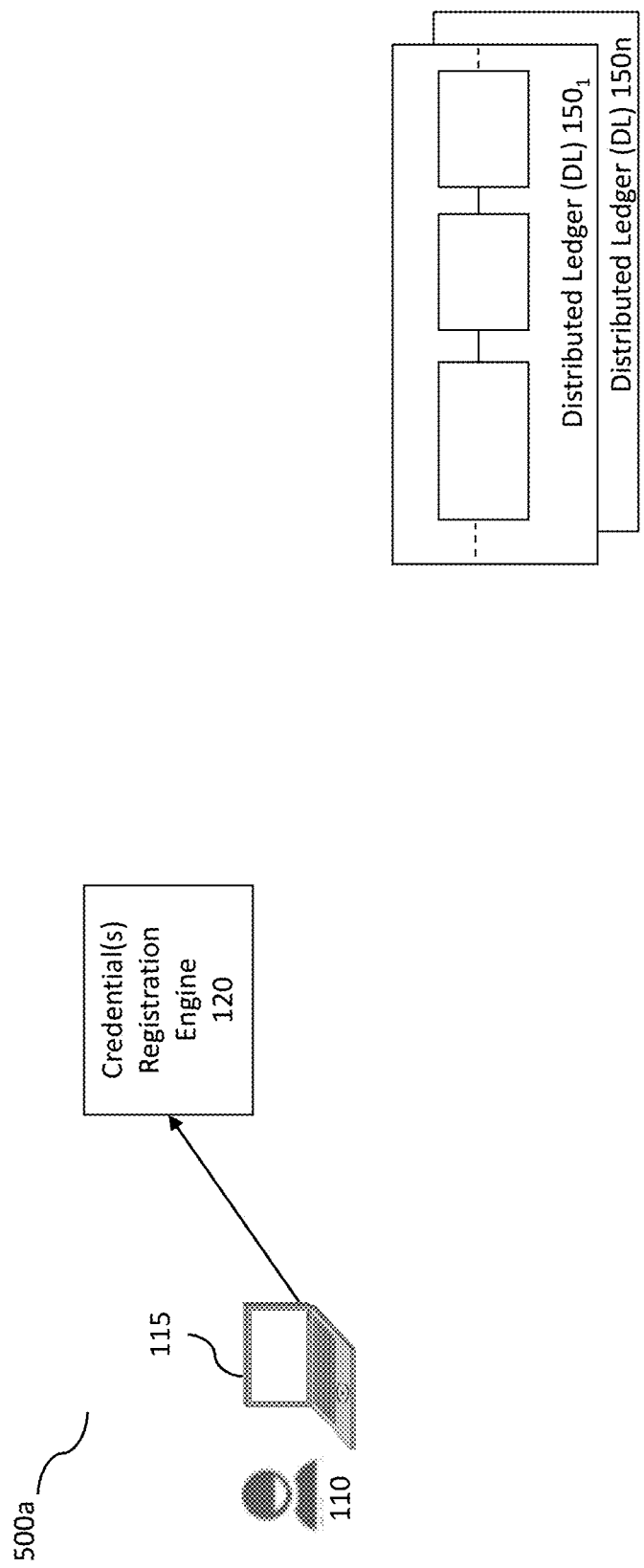
FIGS. 5A-5E provide an illustrative example of an approach for registering a user credential, according to some embodiments of the disclosure.

FIGS. 5A-5E provide an illustrative example of an approach for registering a user credential, according to some embodiments of the disclosure. In FIG. 5A, a user 110 using a user computing device 115 may initiate a request to generate a ZKAI to be used as for user authentication. A credential(s) registration engine 120 may receive the request. The credential registration engine 120 may generate a ZKAI using, as an example, a non-interactive sigma protocol with a Fiat-Shamir Transform and elliptic curves. As discussed above, the credential registration engine 120 does not store the user secret anywhere within its system. In some embodiments, to ensure the user secret is only reproducible by the user, the user secret, when received by the credential engine 120, may have already been encrypted or hashed in a way such that even the credential registration engine 120 may not be able to compute/reverse engineer the encrypted/hashed version of the user secret to reproduce the actual user secret itself.

Figure 5B:
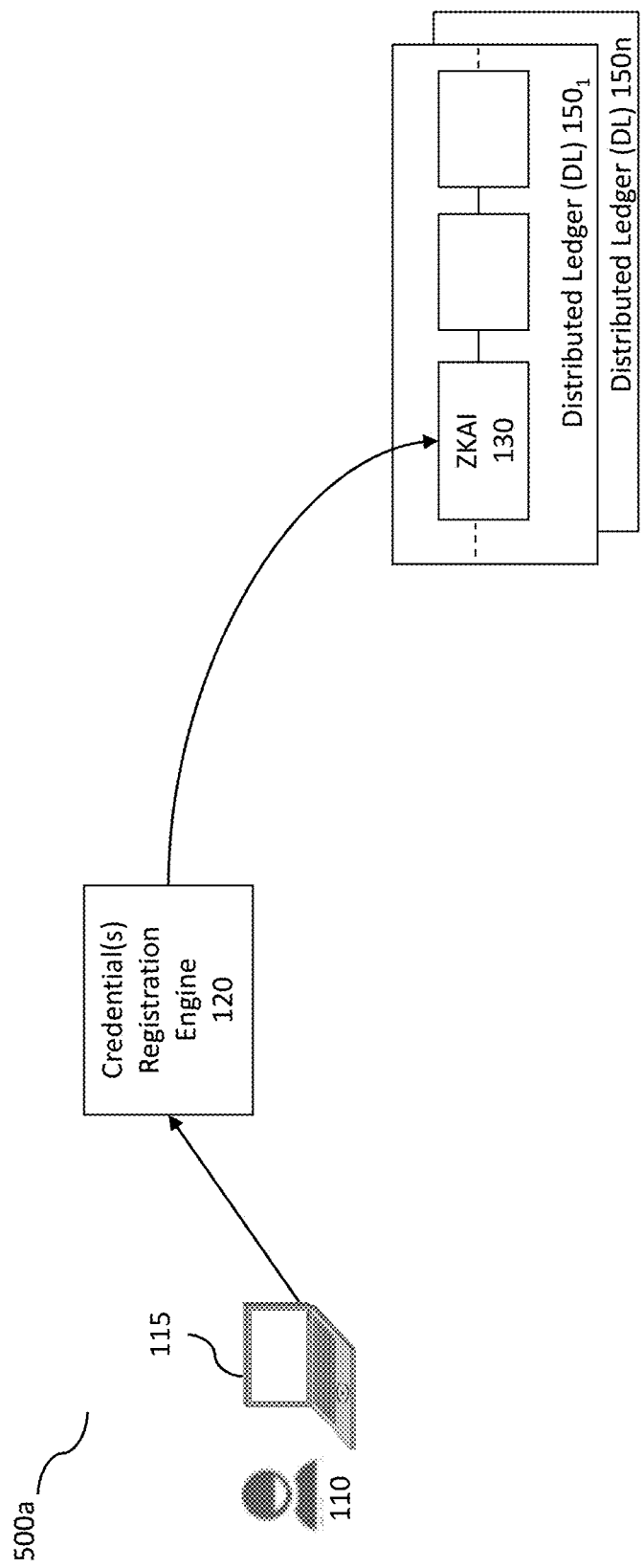
Figure 5C:
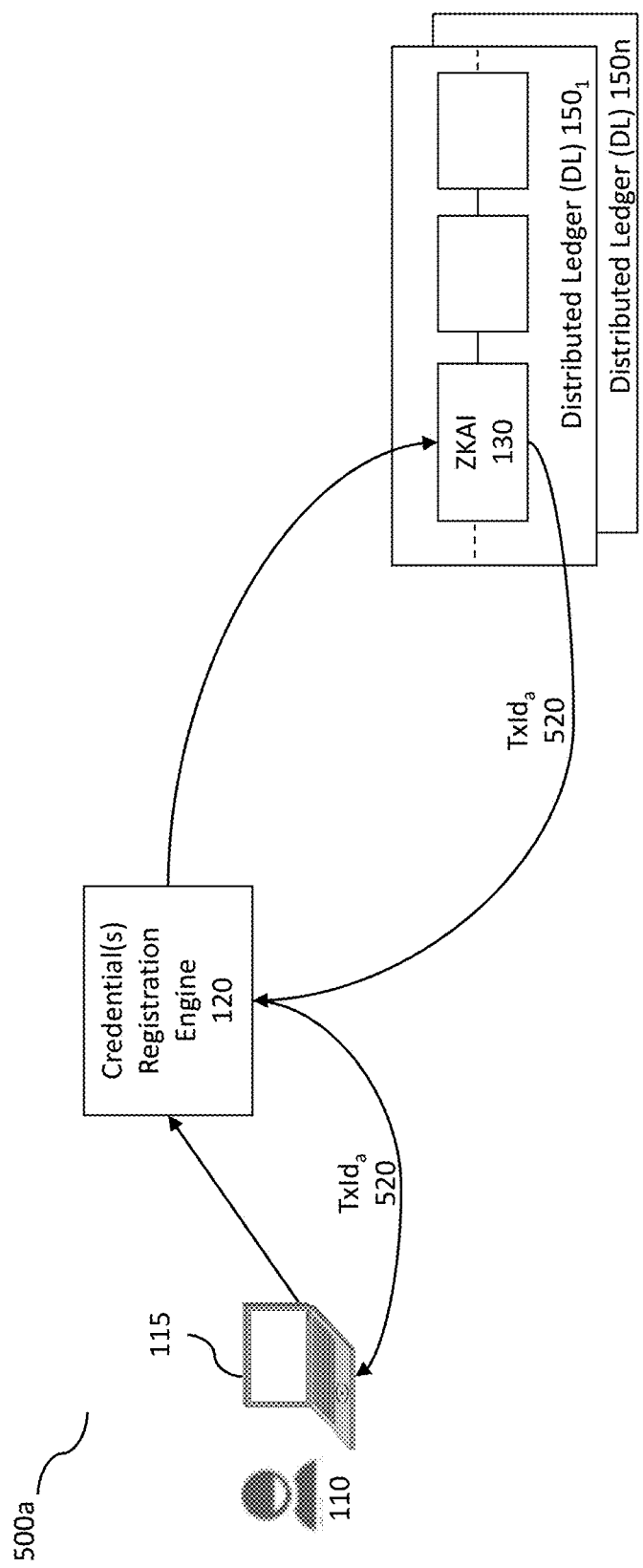
Figure 5D:
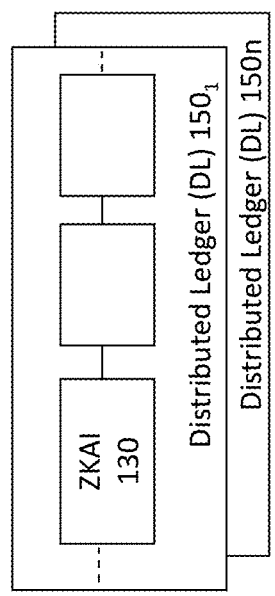
Figure 5D:
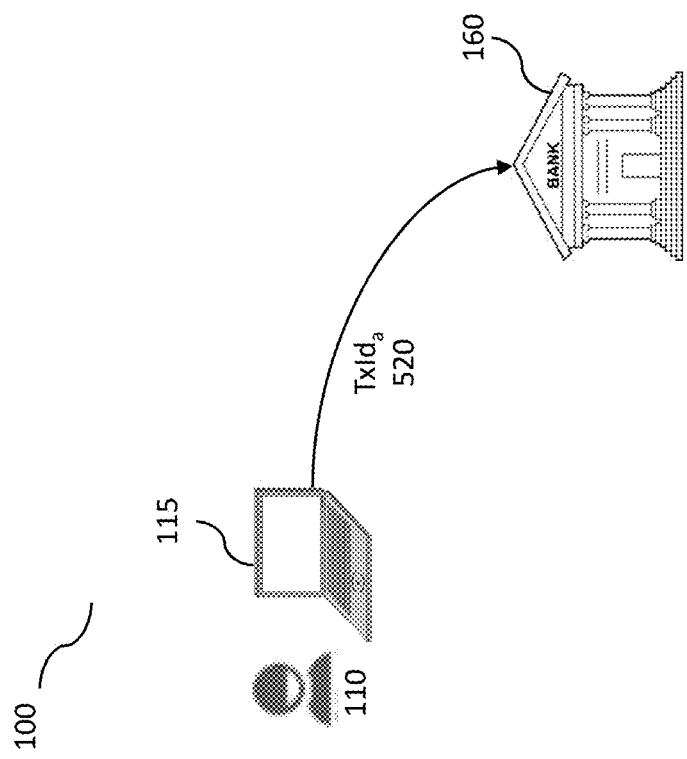

At FIG. 5B, the credential registration engine 120 may register the ZKAI onto a DL $150_1$ as a DL transaction. At FIG. 5C, credential registration engine 120 may receive a transaction ID (e.g., $TxId_a$ 520) corresponding to the DL transaction registered, the transaction ID uniquely identifying the DL transaction storing the ZKAI corresponding to the user secret provided by the user to register for user authentication. The credential registration engine 120 may further send the transaction ID to the user computing device 115 to confirm a successful registration of the user credential. At FIG. 5D, user 110 using the user computing device 115 may register the transaction ID with one or more entities 160 for user authentication, the entity 160 being, as an example depicted in FIG. 5D, a bank. As discussed above, entity 160 may be any entity the user wishes to establish a relationship with, such as, as examples, a retailer, a financial institution, another person, a service provider, etc.

Figure 5E:
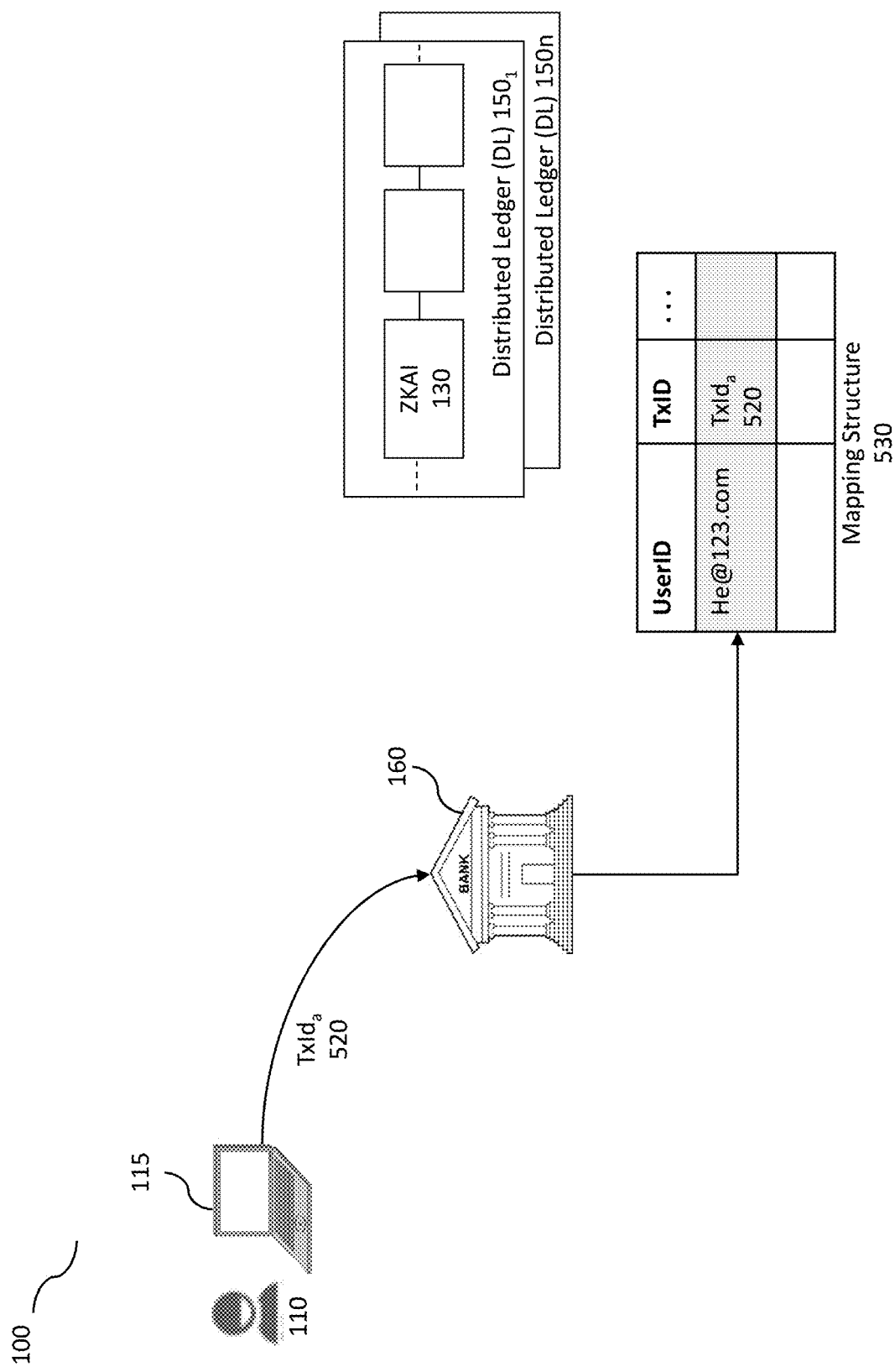

At FIG. 5E, the registration of the $TxId_a$ 520 with entity 160 may generate an entry into a mapping structure 530, the mapping structure 530 comprising a UserID column for uniquely identifying a user and at least a column storing the $TxId_a$ 520. The mapping structure 530 providing an efficient query to retrieve transaction IDs (e.g., $TxId_a$) based at least in part on a UserID provided by the user 110. The UserID may include a unique ID similar to a username. In some embodiments, the mapping structure 530 may be implemented/managed by the entity 160. In some embodiments, a user credential, user authentication, and/or data management service provider may implement/manage the mapping structure 530.

Figure 6:
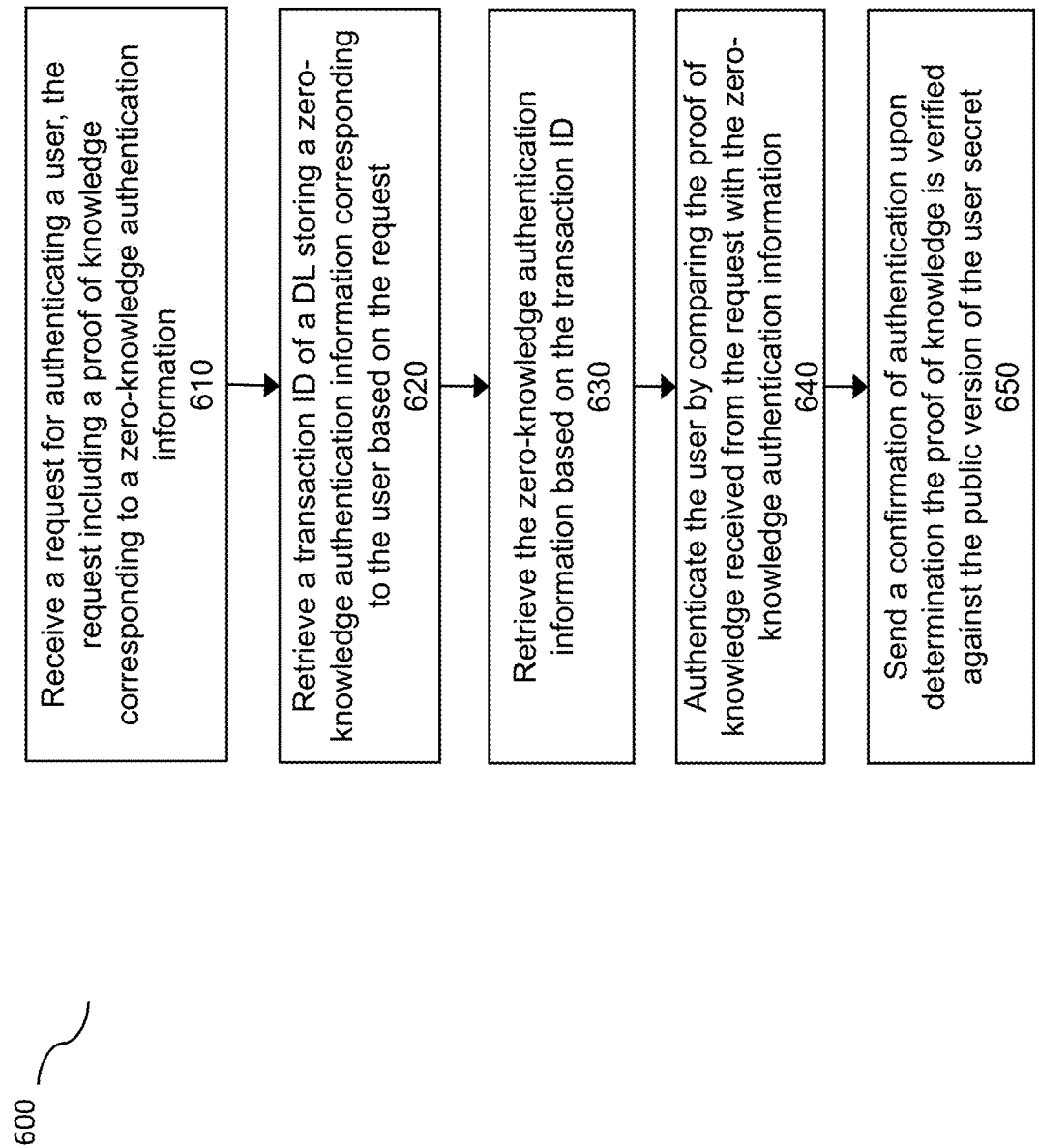
FIG. 6 illustrates an example of an approach for authenticating a user, according to some embodiments of the disclosure.

FIG. 6 illustrates an example of an approach for authenticating a user, according to some embodiments of the disclosure. At 610, a request for authenticating a user is received; the request may include a proof of knowledge (e.g., a proof data) corresponding to a transaction ID uniquely identifying a ZKAI. The proof data not containing the user secret but instead a proof data generated from an input parameter having the user secret. The proof data being generated at the user computing device 115. Thus, the verifying entity never has access to the actual user secret so that only the user retains knowledge of the user secret.

The proof data may be generated using, as an example, a non-interactive sigma protocol with Fiat-Shamir Transform and elliptic curves via Approach #1 or Approach #2, as disclosed above, particularly in the sections where the producer must compute parameters that re sent the verifier (e.g., steps (2)-(6) or (x)-(xxi)). In some embodiments, the request may not initially include a proof data, but instead just a request to begin an authentication such that the authentication server may provide a server secret value (e.g., server secret b, as discussed above) to the user client device, the server secret value allowing each proof of knowledge (e.g., proof data) request to be unique and active only for a defined period of time managed based at least in part on the server secret value. Once the client device receives the secret server value, the client device may generate a proof data that includes the server secret value, the user secret, the publicly known parameters (e.g., the ZKAI), and a prime order of the base point of an elliptic curve.

At 620, the transaction ID of a DL storing a ZKAI corresponding to the user is retrieved based on the request for authenticating the user. The transaction ID being identified based at least in part from a UserID provided by the user. In some embodiments, the transaction ID is retrieved from a mapping structure. At 630, the ZKAI is retrieved based at least in part on the transaction ID.

At 640, the user is authenticated by comparing the proof data received from the request with the ZKAI stored in the DL. The ZKAI having at least one random number parameter and a parameter generated from a Fiat Shamir Transform, the parameter generated from the Fiat Shamir Transform allowing each proof data to be unique. In some embodiments, the proof of knowledge received from the request may be generated based at least in part on a secret server value such that the secret server value provides an ability to ensure no portions of the messages between the client device and the authentication engine has been tampered. In some embodiments, comparing the proof data received from the request with the ZKAI stored in the DL is performed using, as an example, computations disclosed in the non-interactive sigma protocol with Fiat-Shamir Transform and elliptic curves—Approach #2 section above, particularly using equations/formulas (xxii)-(xxx).

At 650, a confirmation of authentication is sent upon determination that the proof data is verified against the ZKAI.

Figure 7A:
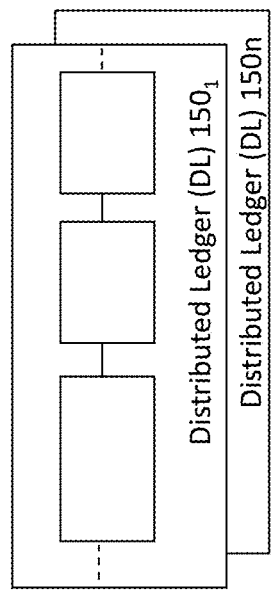
FIGS. 7A-7E provide an illustrative example of an approach for authenticating a user, according to some embodiments of the disclosure.
Figure 7A:
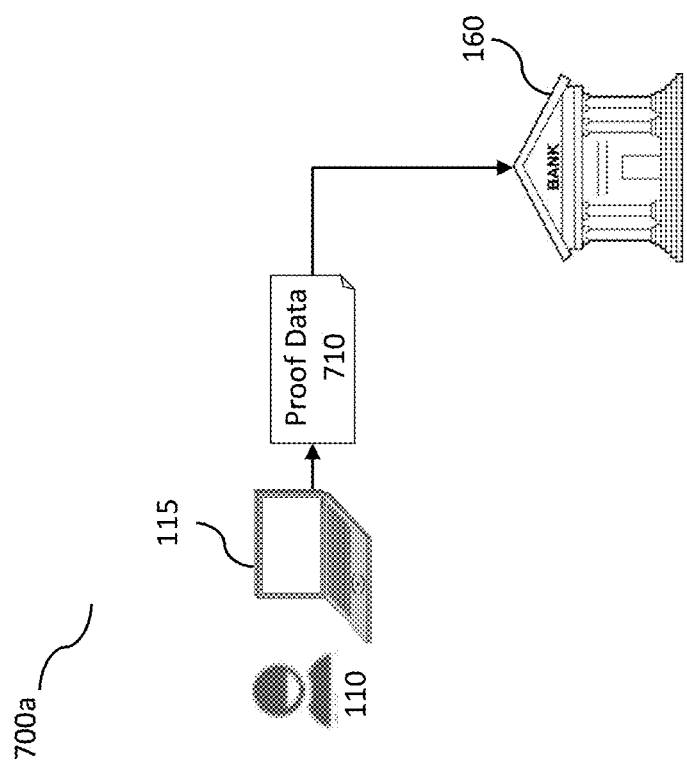

FIGS. 7A-7E provide an illustrative example of an approach for authenticating a user, according to some embodiments of the disclosure. In FIG. 7A, a user 110 using a user computing device 115 initiates a process to authenticate the user with an entity 160 (e.g., a bank) by sending a proof data 710.

Figure 7B:
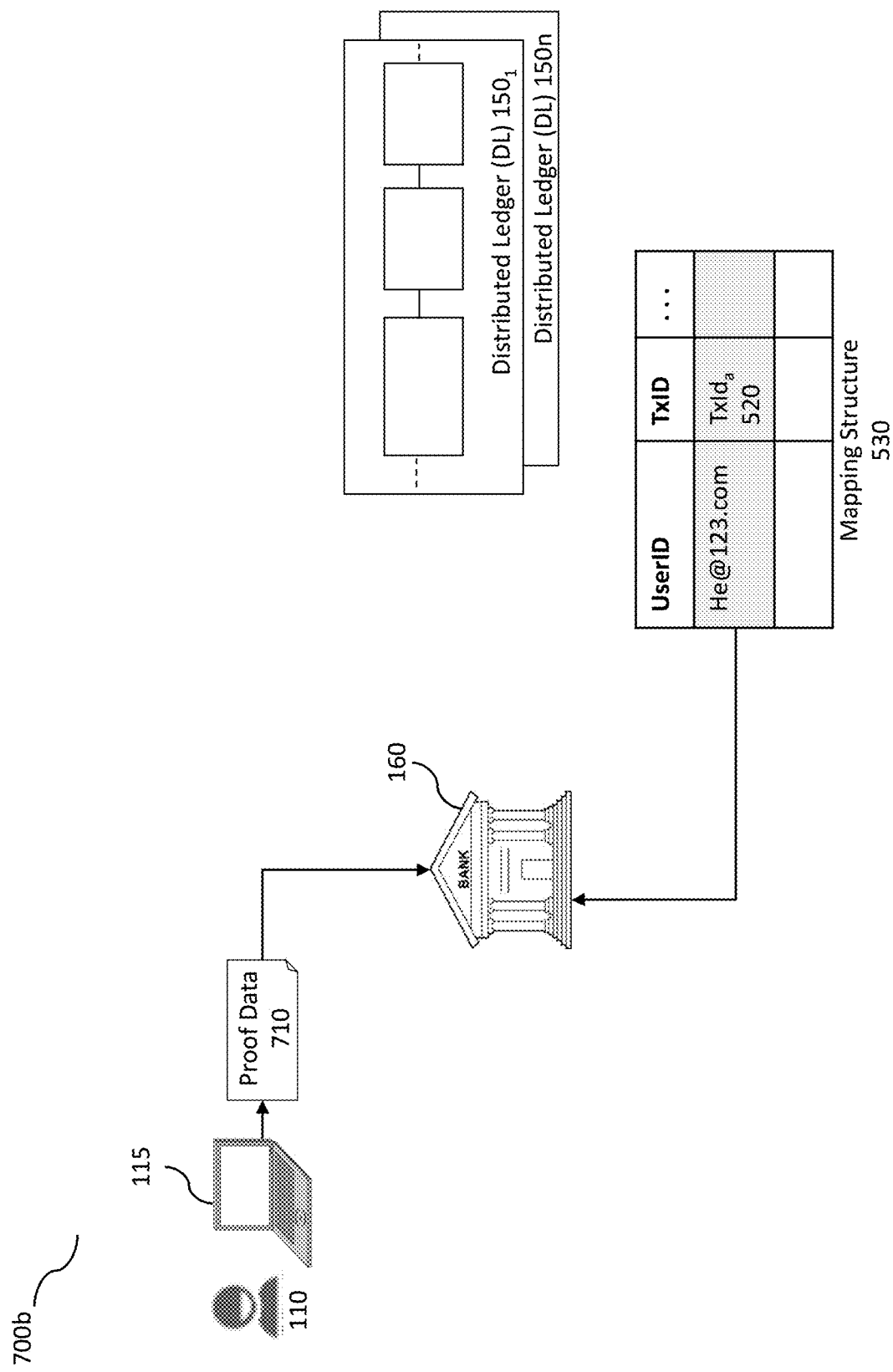
Figure 7C:
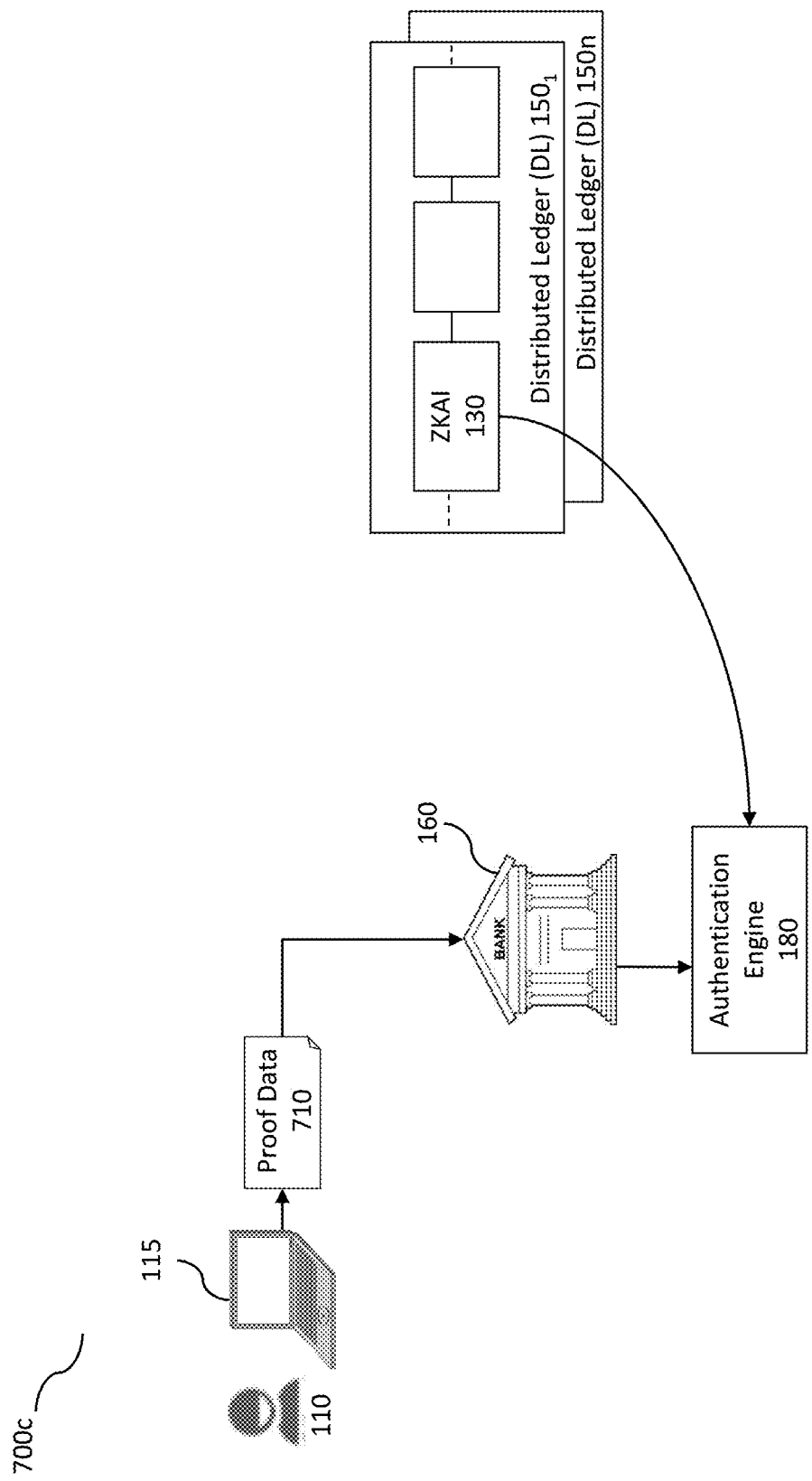
Figure 7D:
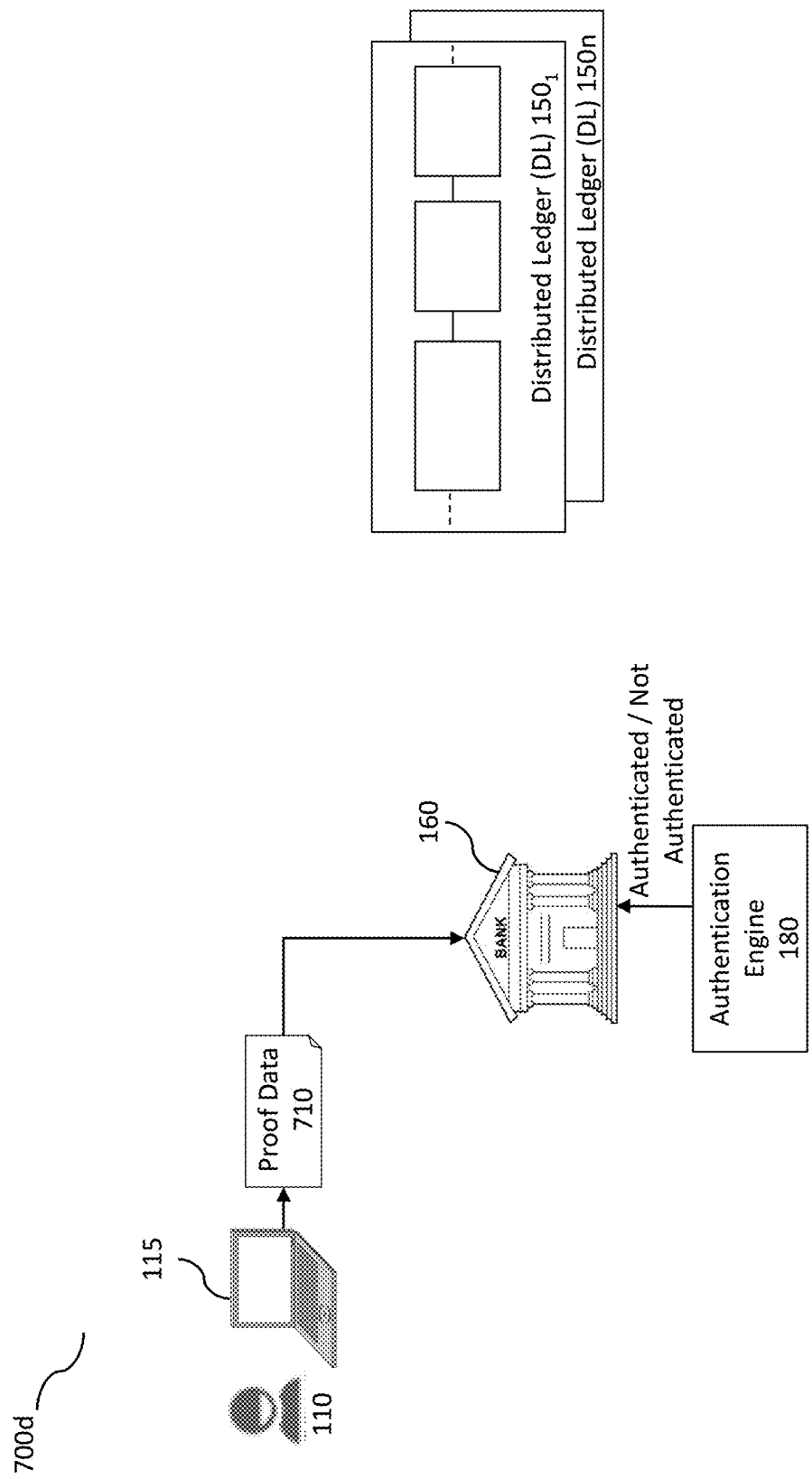
Figure 7E:
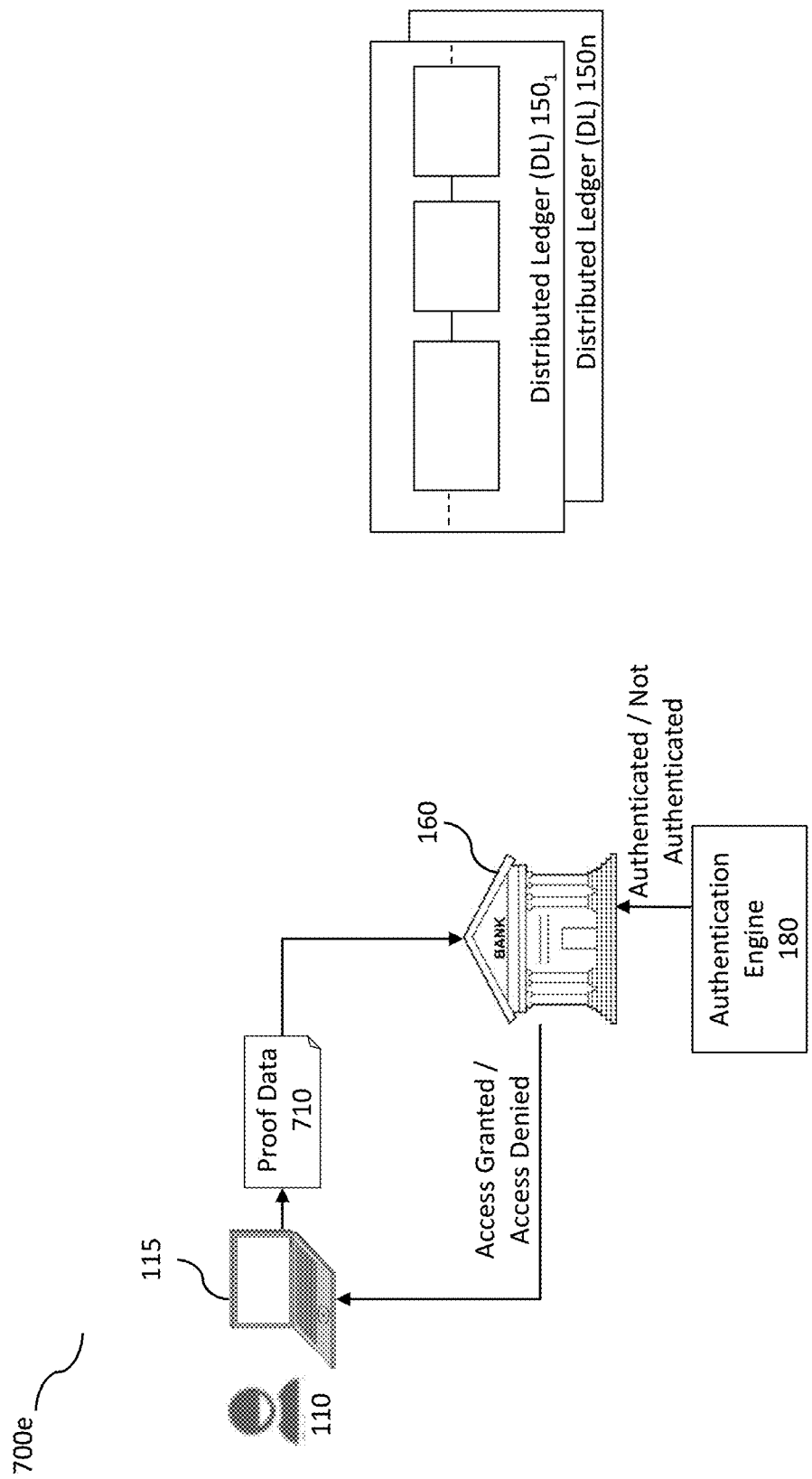

At FIG. 7B, a transaction ID of a DL 150 storing a ZKAI corresponding to the user based on the request is retrieved by the entity 160 via a mapping structure 530, the transaction ID of the DL 150 corresponding to a UserID previously registered with entity 160. At FIG. 7C, the ZKAI is retrieved based on the transaction ID associated to/provided by the user 110. At 7D, the authentication engine authenticates the user 110 by computing/comparing the proof data 710 received from the user computing device 115 and the ZKAI retrieved from the DL using, as an example, mathematical equations of (xxii)-(xxx) as discussed above. If the computation/comparison is successful, the authentication engine will send an "authenticated" indicator to the entity 160. If the computation/comparison is unsuccessful, the authentication engine will send a "Not Authenticated" indicator to the entity 160. At FIG. 7E, upon receiving an "authenticated" indicator, entity 160 may grant access to allow the user 110 to access to the information, service, assets protected by the authentication. However, upon receiving a "Not Authenticated" indicator, entity 160 may send a message indicating a failed authentication request, and thus, denying the user access.

Figure 8A:
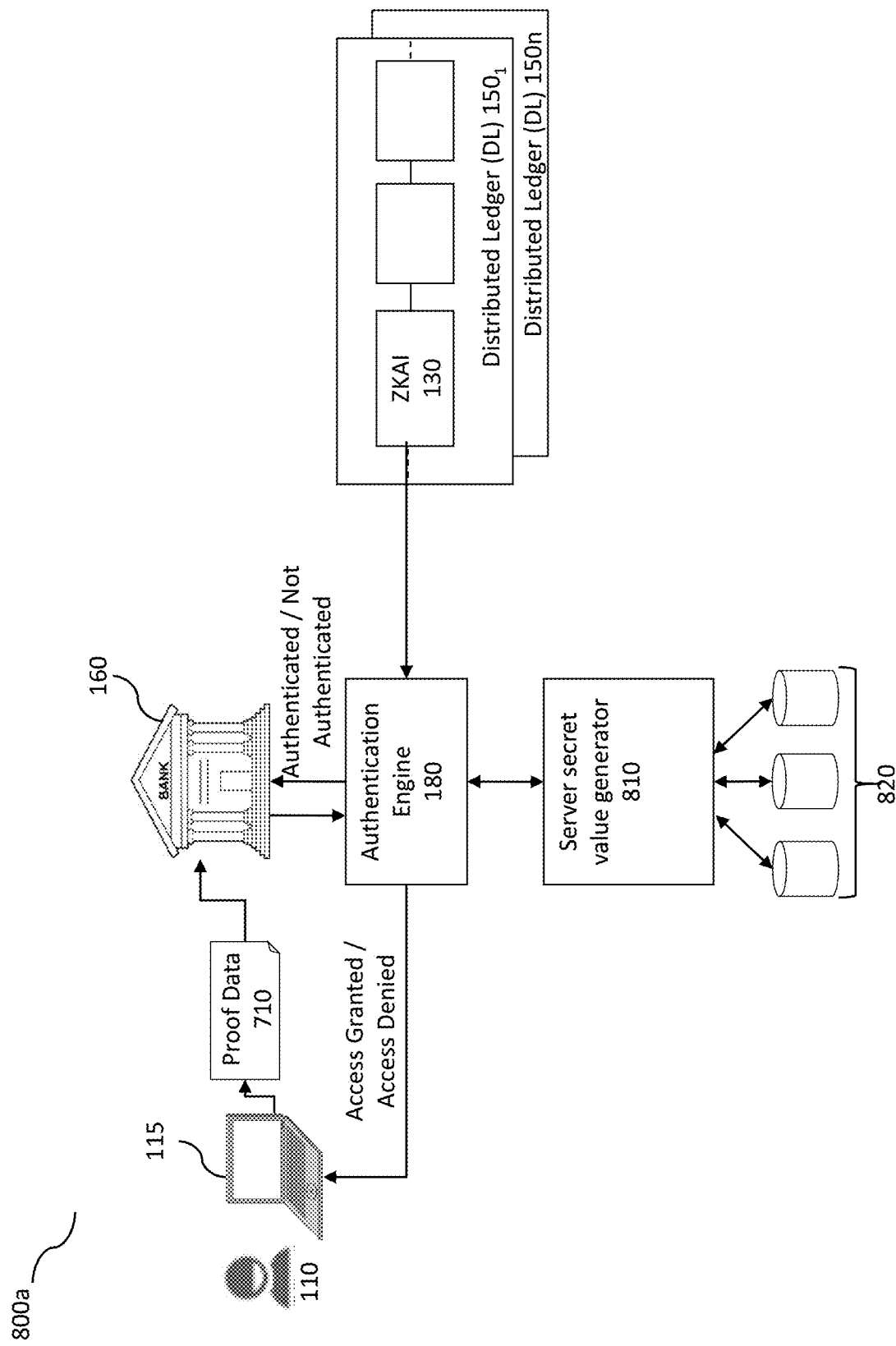

FIGS. 8A-8E illustrate various architectural system configurations for implementing various embodiments of the present disclosure. FIG. 8A depicts a system 800a for authenticating a user having a server secret value generator 810 and one or more databases of keys 820 that rotates every so often (e.g., every 2 minutes) to help generate and manage server secret values (e.g., server secret b, as discussed above) so that the authentication engine may remain a stateless service which does not need to maintain any state information w/r/t to the server secret values being issued, managed, and reissued. The secret server value generator 810 may include a load balancer for balancing server secret value requests and management of the server secret values for the authentication engine 180. The load balancer ensures that requests for server secret values are generated from a particular database of keys 820 and verified by the same particular database of keys 820.

For example, if a user initiates an authentication that uses a server secret value, the authentication engine may request a server secret value to be generated and maintained by the server secret value generator 810. The server secret value generator 810 may assign an available key from a particular database of keys 820 to provide the authentication engine. The server secret value generator 810 knows which database of keys 820 is associated to the assigned available key so that the server secret value generator 810 may be able to validate for the authentication engine 180 that the server secret value has not been tampered with and is still active within a defined interval of time. The available keys may be, as an example, a randomly generated value of an order of a specified elliptic curve.

It is important to note that the server secret value that is sent to the user computing device may be a hash of the key that was assigned such that when the server secret value is sent back to the server secret value generator 810 during authentication processing from authentication engine 180, the hash value of the server secret value may be reverse engineered to determine whether the assigned key value is still the same key value, in order to confirm the proof data is still unique, active within the defined lifetime of the proof data, and non-tampered. The number of keys maintained by each database of keys 820 is a small enough number of keys (e.g., 100) such that the reverse engineering of the hashed value of the server secret value can be determined in a quick timely manner since there is only a limited number of keys to be provided in the computation of the key value from the hashed version of the key value provided by the authentication engine.

Figure 8B:
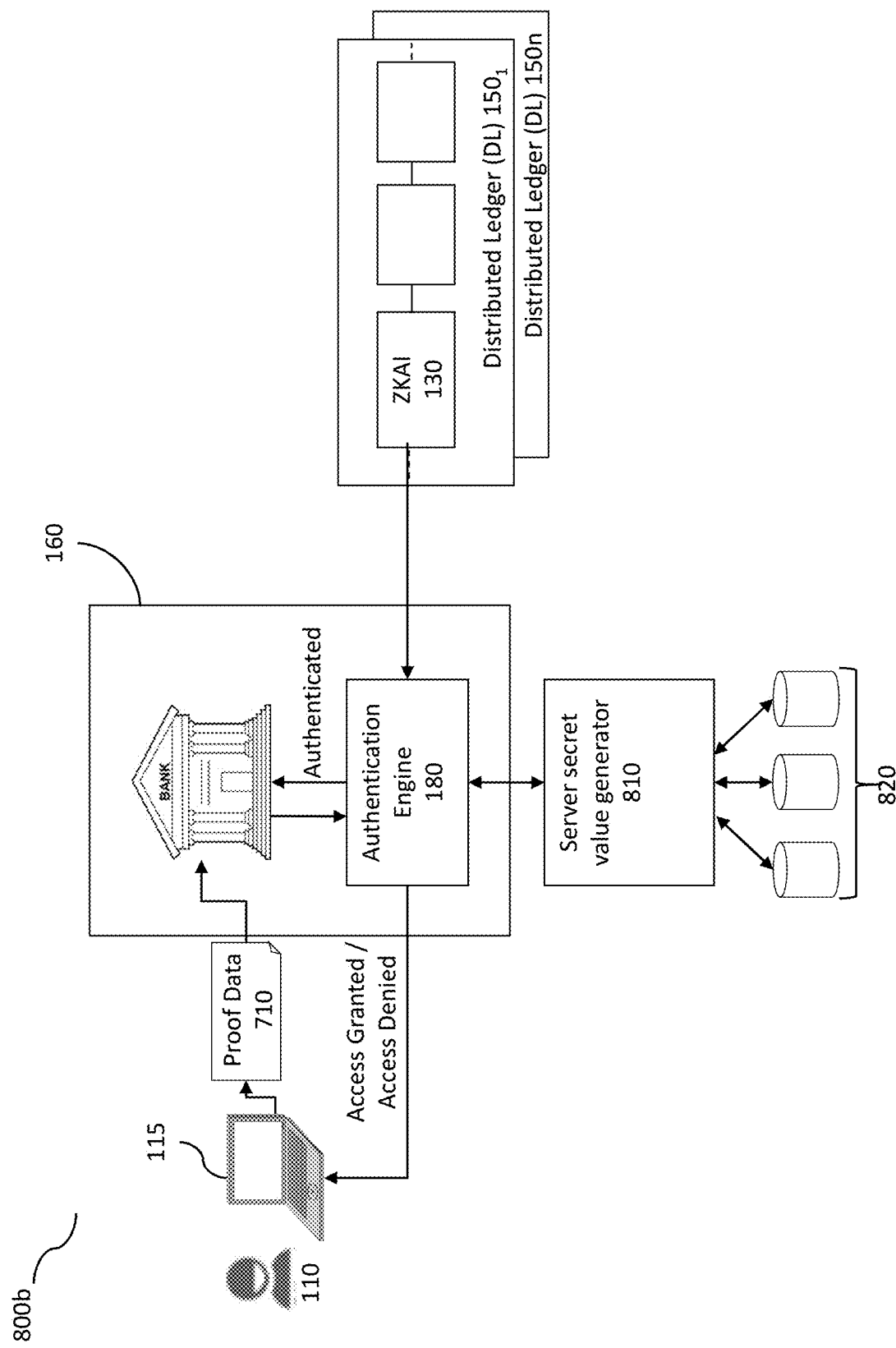

FIG. 8B depicts an example system architecture, according to some embodiments, where the authentication engine 180 may be implemented by the entity 160, while the server secret value generator 810 and the DL 150 are implemented by other systems not operated or under the control of entity 160.

FIG. 8C depicts an example system architecture, according to some embodiments, where the authentication engine 180 and the server secret value generator 810 is managed and maintained by entity 160 while the DL 150 remains public in a trustless environment.

Figure 8D:
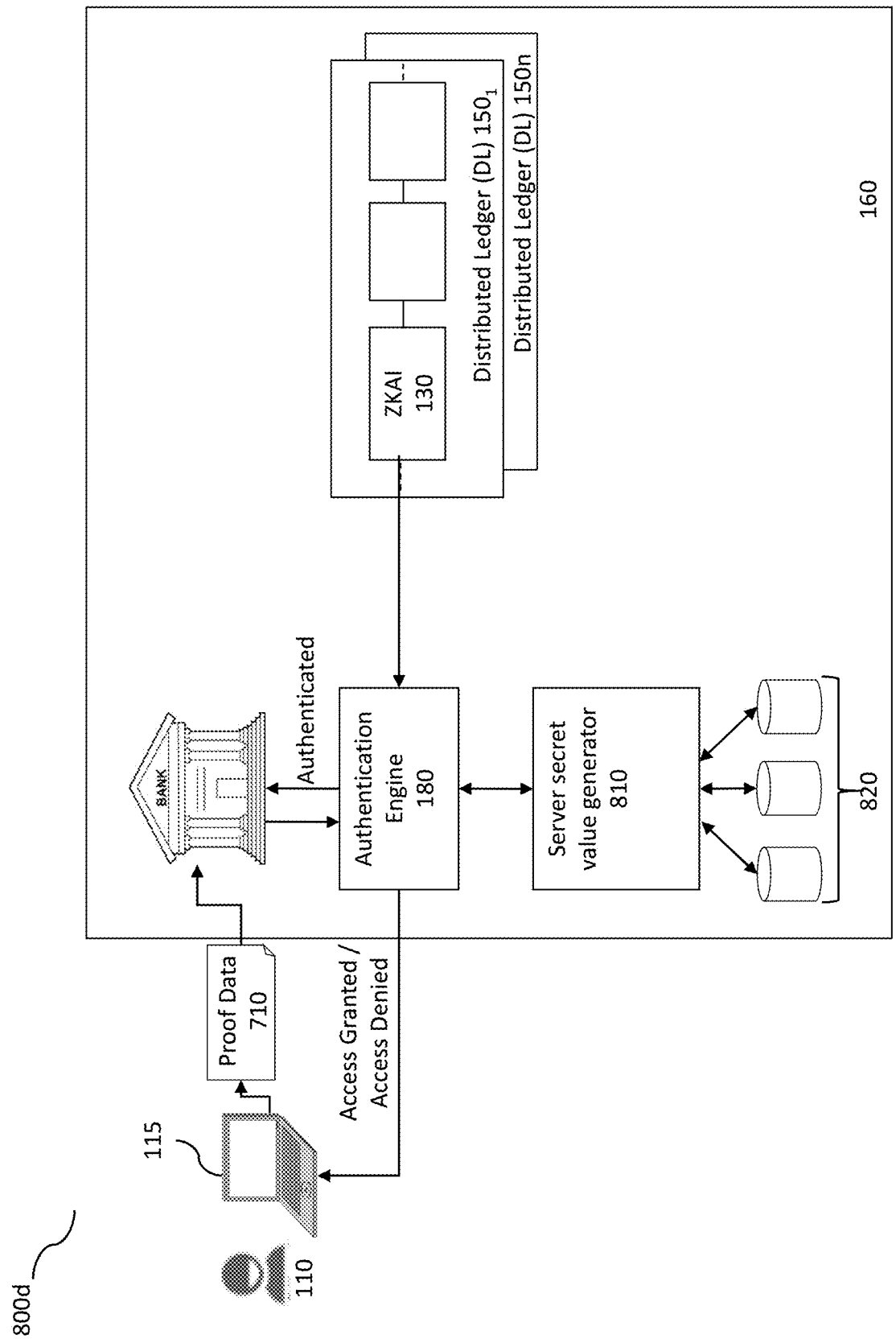

FIG. 8D depicts an example system architecture, according to some embodiments, where the entire user credential registration engine 120 (not shown) and the user authentication engine 180, along with the DL 150 are managed and maintained by entity 160. In this example, entity 160 may be a large enough entity such as a giant online retailer or a large bank or a government agency that may need to manage all user credential and authentication processing within its private and trusted network. In this example, entity 160 may be implementing a trusted environment as opposed to a trustless environment.

Figure 8E:
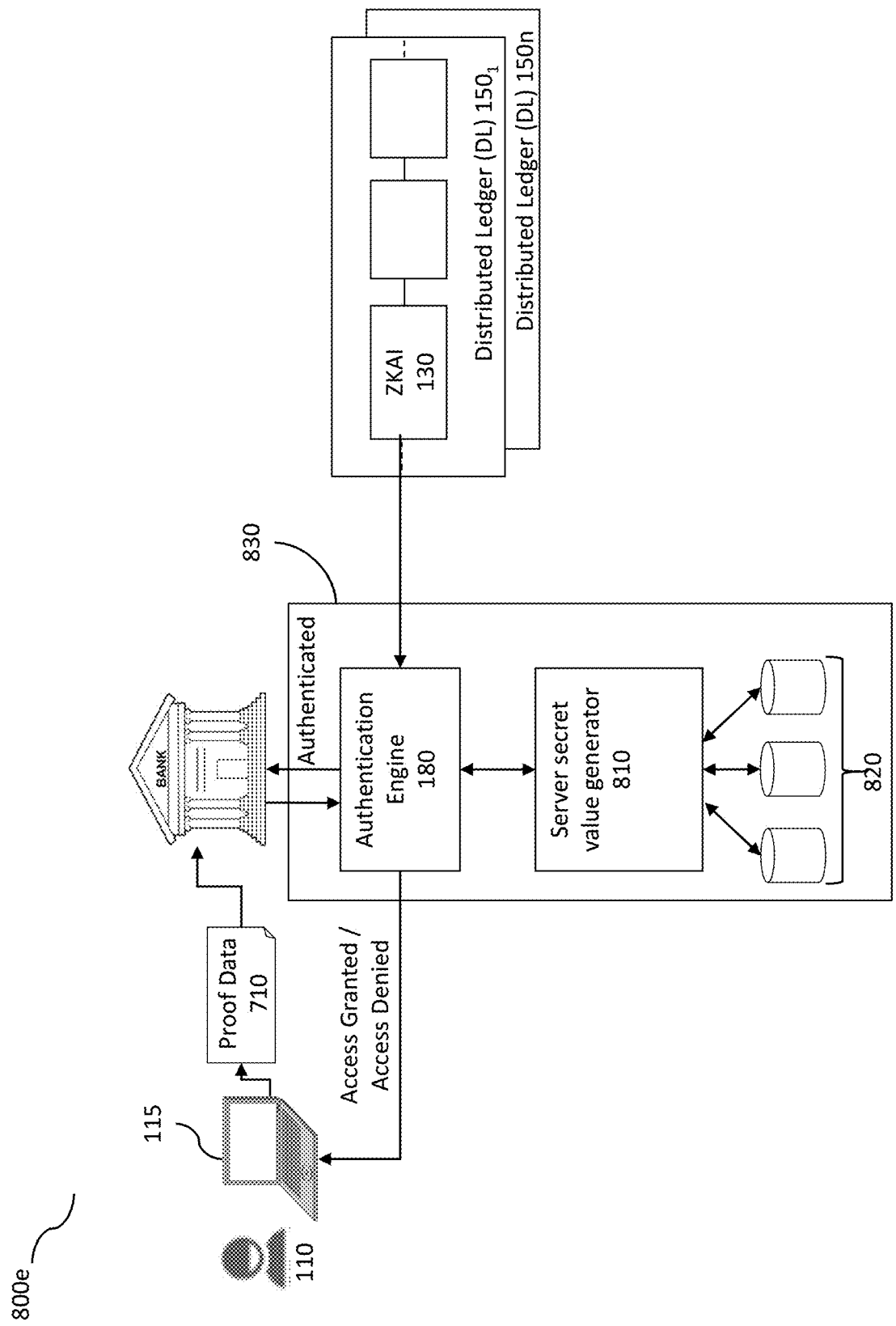

FIG. 8E depicts an example system architecture, according to some embodiments, where a service provider 830 may provide credential registration (not shown) and user authentication processing as a service, while still maintaining a trustless and distributed environment.

The service provider 830 may provide services such as mapping management of UserIDs to transaction IDs, to allow users to maintain online identities by claiming to possess a user secret associated to a transaction ID corresponding to publicly known parameters (e.g., ZKAI 130) stored on a DL. The mapping of the UserID to a transaction ID is owned by the user because without the user providing the user secret associated to the ZKAI corresponding to the transaction ID, the mapping of the UserID to the transaction ID and the ZKAI stored in the DL is useless to anyone else who does not know the user secret. In some embodiments, the service provider may maintain the mapping of the UserID to transactions for user 110, in a data structure similar to the mapping structure 530 as disclosed in FIGS. 5D-5E. In this embodiment, upon the user 110 registering with the entity 160, entity 160 may communicate with the service provider 830 to receive one or more transaction IDs of user 110 for the purpose of registering the user 110 with the entity 160. In some embodiments, the mappings of UserID and transaction IDs may also be managed and maintained by the user 110.

Figure 9:
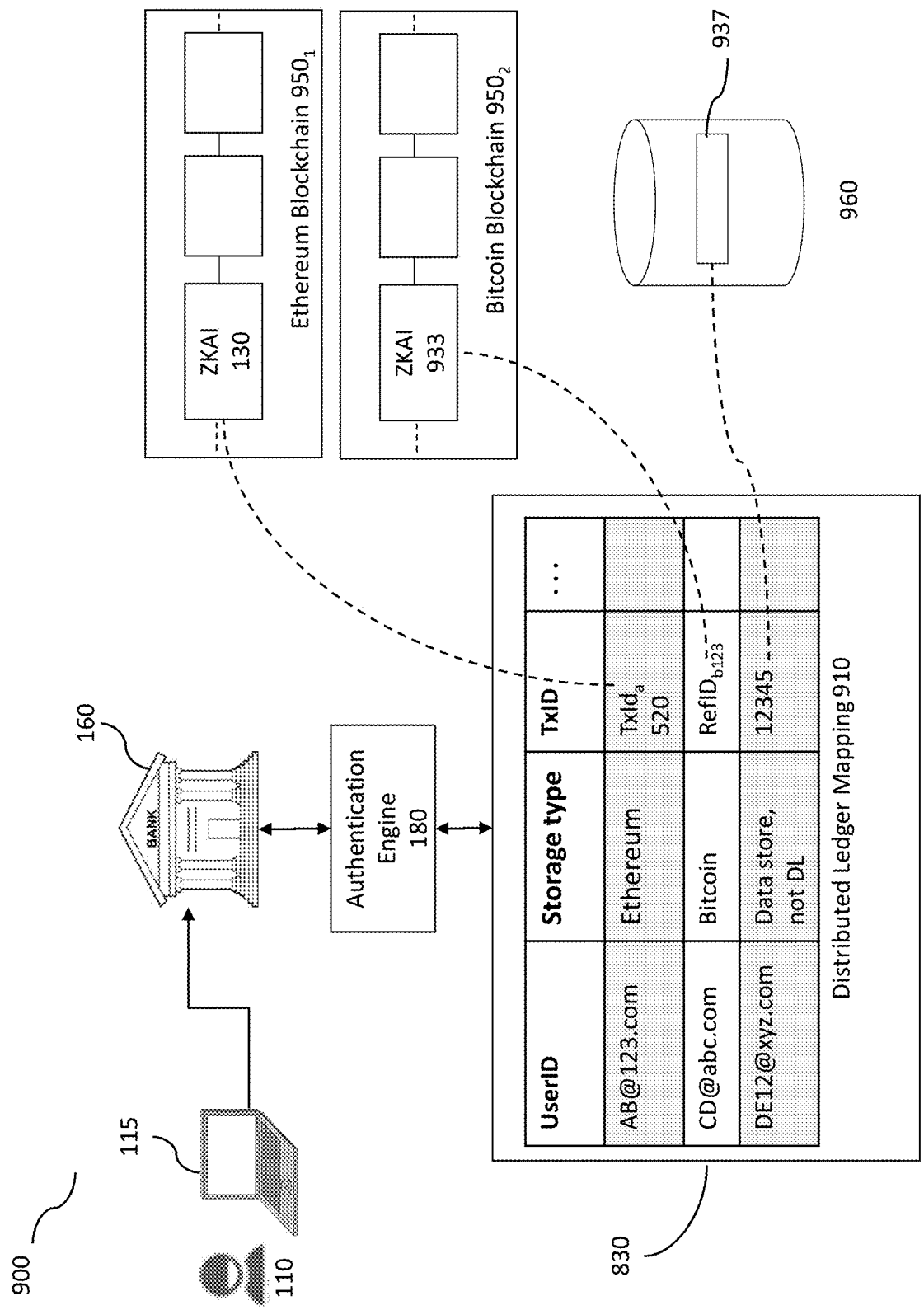
FIG. 9 illustrates a system for registration and authentication of user credentials across multiple types of back end storage, according embodiments of the disclosure.

FIG. 9 illustrates a system for registration and authentication of user credentials across multiple types of back end storage including different blockchains as well as non-blockchain types of storage, according embodiments of the present disclosure. The reason this feature is important is because certain banks, as an example, may only allow data to be stored on an Ethereum blockchain because they may not trust or approve of a Bitcoin blockchain. As another example, certain enterprise clients may like the concept of a decentralized and distributed ledger but may not allow user authentication information to be stored on a public blockchain, but instead would rather store their user authentication information in a decentralized manner on private servers. Or, as another example, a user may have multiple accounts for different entities, wherein some entities (e.g., international entities) may require their authentication data to be stored on different types of blockchains. Or yet as another example, a user may want to combine their company IDs and their non-company IDs in a portable manner so that no matter where the user works at or which banks a user may move to, the user may still be able to use the same user secret(s) for authentication purposes.

To solve these problems, embodiments of the disclosure disclose an example system that is flexible enough to meet these different technical challenges. Some embodiments include a particular data structure for mapping transaction IDs across one or more different types of distributed ledgers and non-distributed ledgers to support managing user authentication data across different types of blockchains and non-blockchains storage, according to some embodiments of the disclosure.

System 900 may include a user 110, a user computing device 115, an entity 160, an authentication 180, a service provider 830, a distributed ledger mapping table structure 910, a plurality of different types of DLs 950 (e.g., Ethereum Blockchain 950₁ and Bitcoin Blockchain 950₂) and a non-blockchain data storage 960. The distributed ledger mapping table structure 910 may be a special data structure for managing different types of transaction IDs pointers to authentication data stored on different types of data storages, the different types of data storages comprising different types of DLs 950 and non-DL data storages 960. Each row of data of the mapping table structure 910 correlates to a different authentication entry, wherein a column of the mapping table structure 910 identifies a specific blockchain storage type and another column identifies a link or a pointer to a specific entry within a particular blockchain/data storage that stores the ZKAI.

The dashed lines as depicted in FIG. 9, illustrates which storage system is currently storing the respective ZKAI for the respective user. In use, when a user 110 requests to be authenticated by, as an example, entity 160, the entity 160 may communicate with an authentication engine 180 to perform the authentication. In order for authentication engine to receive a corresponding ZKAI corresponding to the user, an authentication engine 180 may communicate with service provider 830. Service provider 830 may manage a distributed ledger mapping structure 910 that may be queried to retrieve one or more storage locations storing respective ZKAIs corresponding to the UserID received from the user. The service provider 830 may be able to determine which storage type the ZKAI is stored on and the respective link or pointer (e.g., transaction IDs/rowids of the ZKAI). The service provider 830 may then send the transaction ID(s)/rowid(s) to the authentication engine 180 for retrieval of the respective ZKAI from the different storage types (e.g., different blockchains and non-blockchain storages). Therefore, embodiments of the present disclosure illustrated in FIG. 9 provides the ability for registration and authentication of user credentials across multiple types of back end storage including different blockchains as well as non-blockchain types of storage.

Figure 10A:
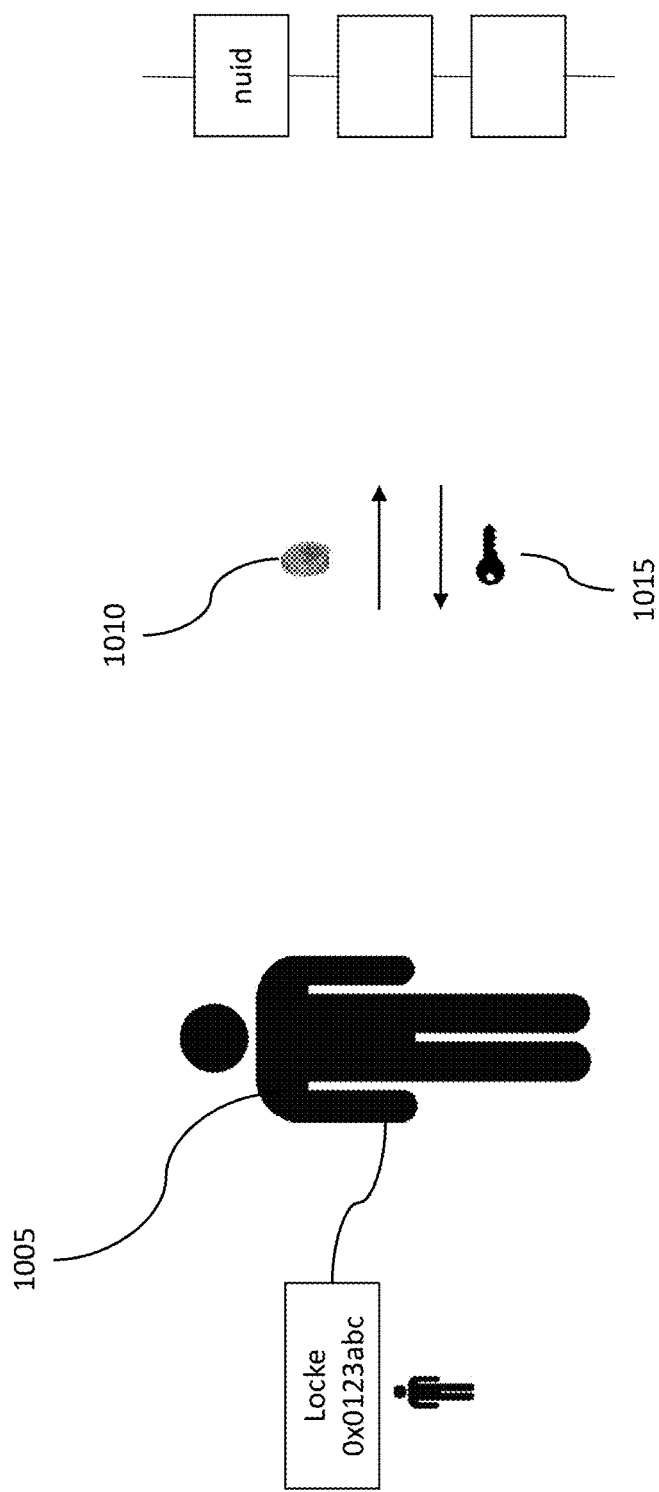
FIGS. 10A-10I provide an illustrative embodiment, according to some embodiments of the disclosure.

FIGS. 10A-10I provide an illustrative embodiment, according to some embodiments of the disclosure. FIG. 10A, depicts an illustration of methods, apparatus, and systems for distributed trustless authentication. For example, an individual 1005 may provide authentication (e.g., fingerprint 1010) and receive their private key 1015 in return. Like a keyring to a multi-tiered security locker, each key in the key ring may provide a multi-factor authentication system similar to a multi-tiered security locker. A service provider (e.g., entity 160 and/or service provider 830 shown in FIG. 8) may provide private keys that are fragmented, encrypted, and stored on a distributed ledger 1020.

Figure 10B:
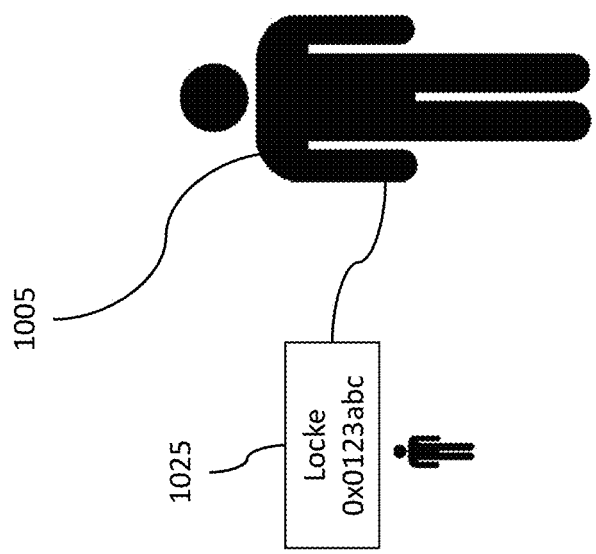
Figure 10C:
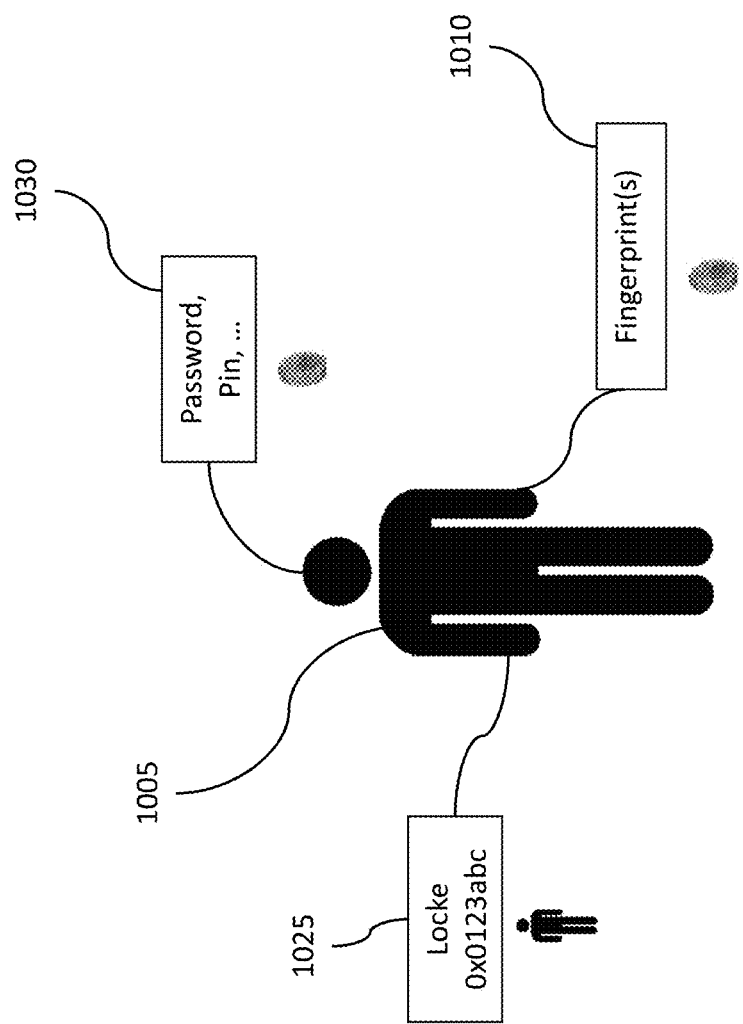
Figure 10D:
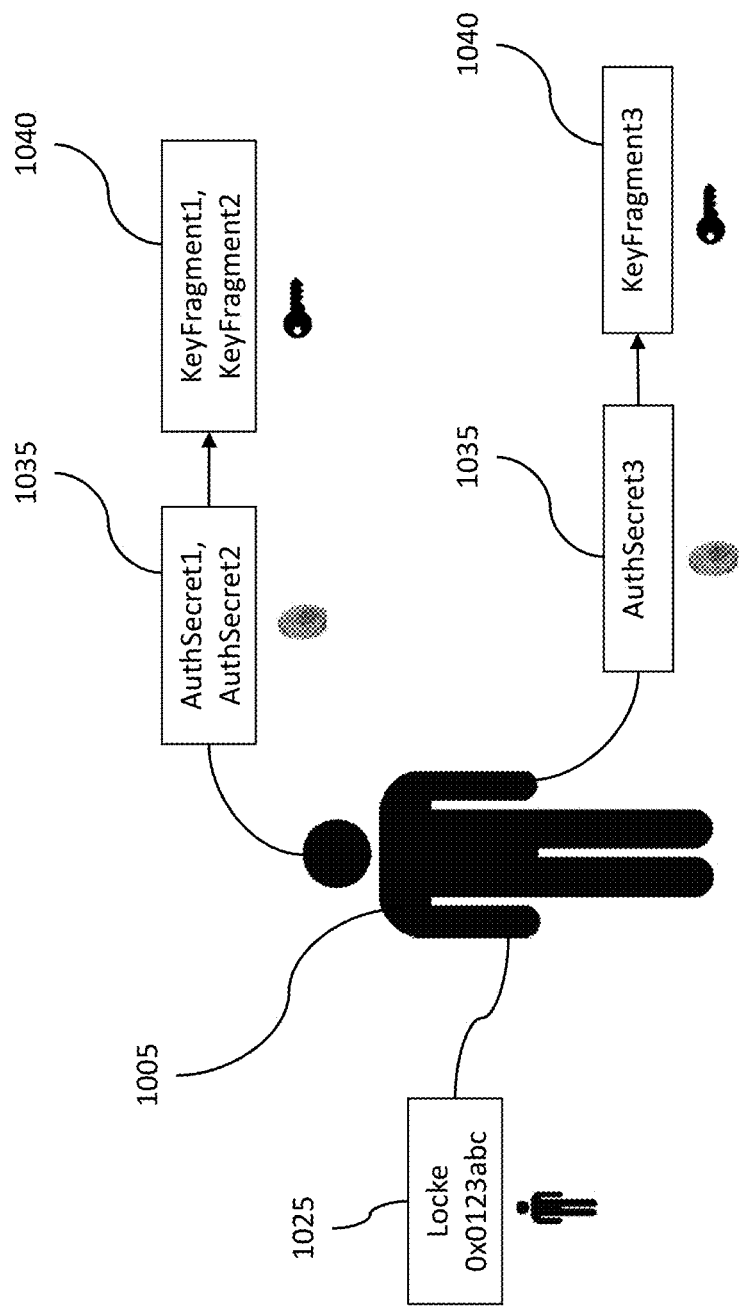

FIG. 10B shows individuals such as individual 1005 may have one universally unique Unique ID 1025. The Unique ID 1025 may be a hash generated at a first login. The Unique ID may be similar to a username. FIG. 10C shows individuals may have any number of auth secrets. As disclosed above, an auth secret may be synonymous with a user secret. Auth secrets are never stored on any devices. An auth secret may be one or more fingerprints 1010 of an individual. An auth secret may also be a password, or a pin 1030. FIG. 10D shows an example of auth secrets 1035 converted to key fragments 1040. Individuals 1005 may register auth secrets 1035 and receive generated key fragments. A key fragment structure may depend on encryption scheme (e.g., prime factorization, pairing . . . ).

Figure 10E:
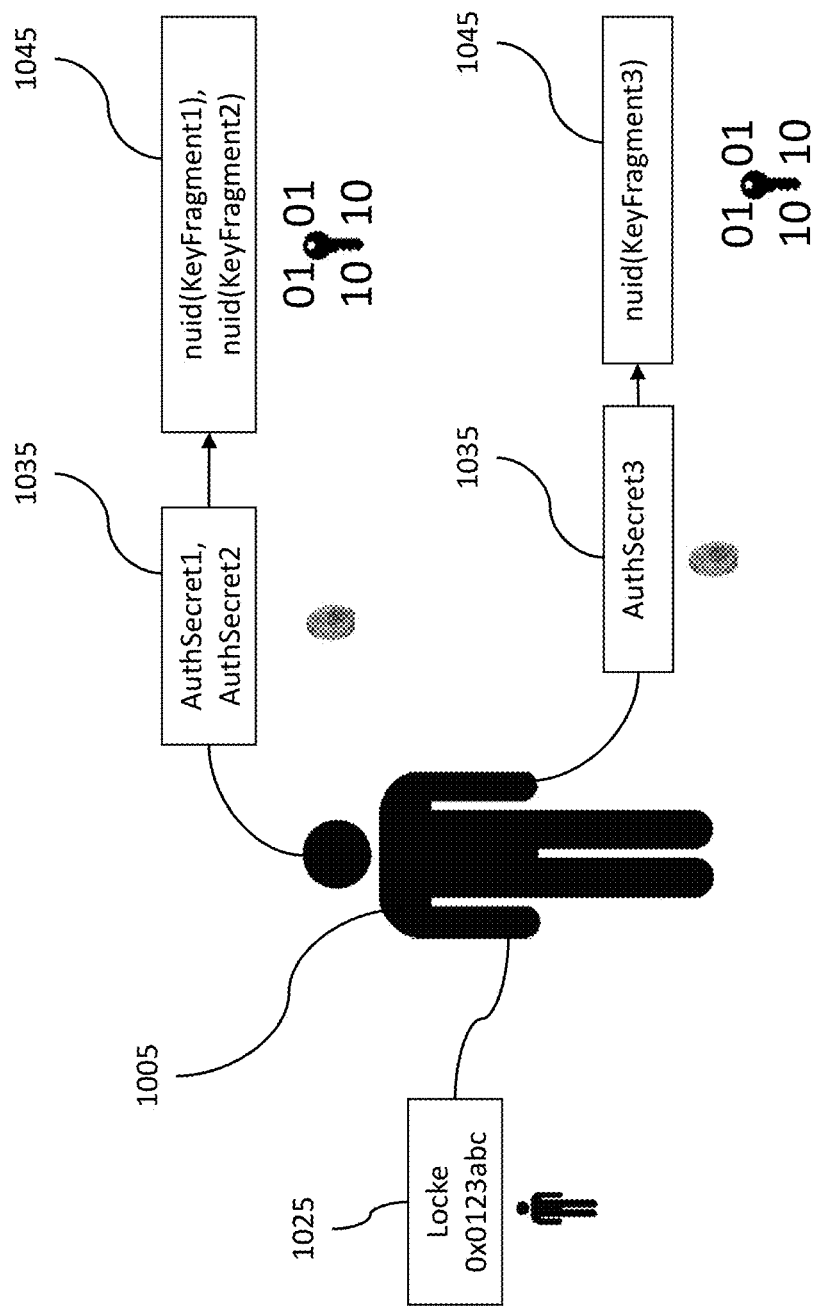
Figure 10F:
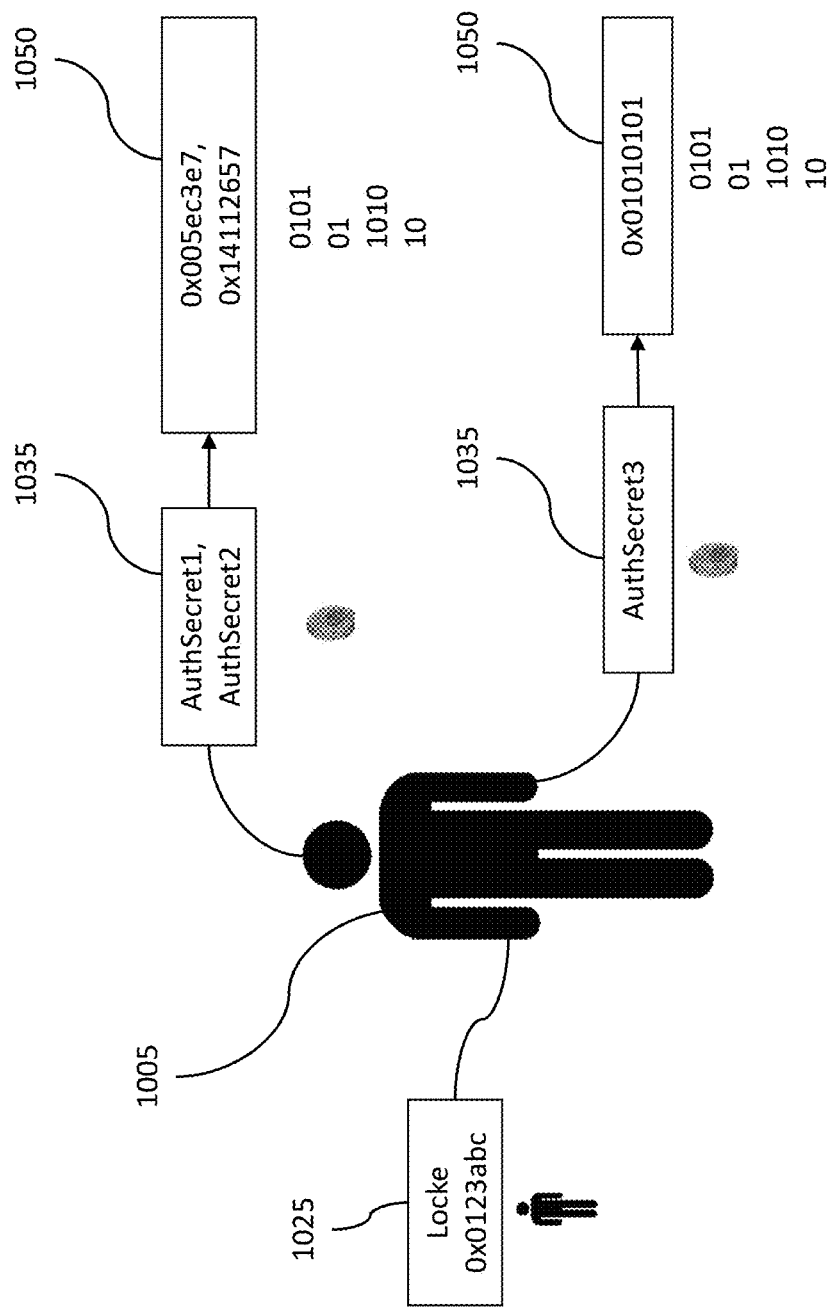
Figure 10G:
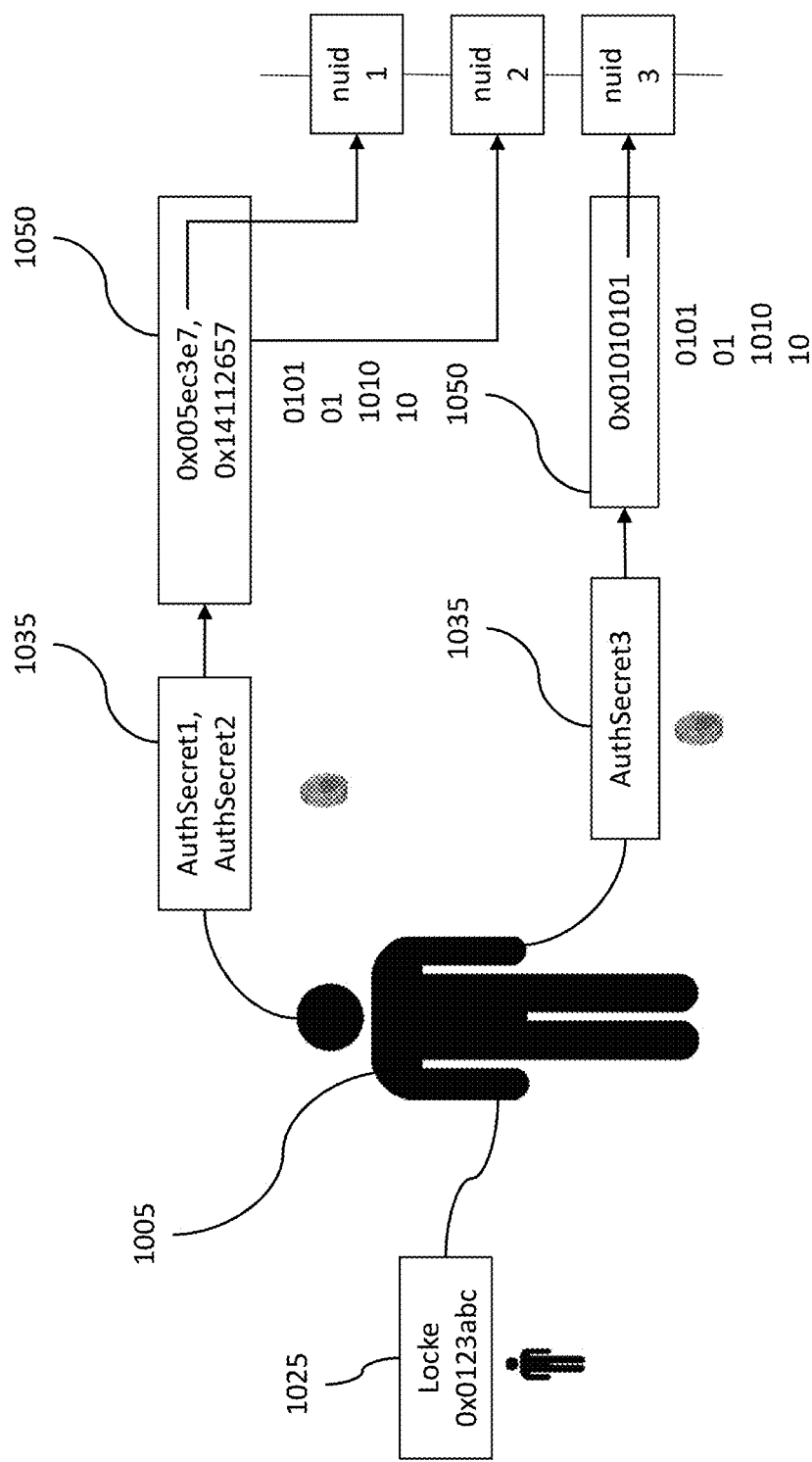

Embodiments of the present disclosure, as shown in FIG. 10E, disclose a protocol 1045 that includes a self-contained, secure way to identify when a Key Fragment has been correctly decrypted, for example, with a checksum of the Key Fragment surrounded by noise. Some embodiments of key fragments correspond to the ZKAI disclosed above. FIG. 10F shows an data structure 1050 that is encrypted under a H(UniqueID+H(Auth Secret)). FIG. 10G shows an example of the data structures 1050 that were encrypted are appended to the distributed ledger 1020. Some embodiments of the data structures 1050 correspond to the ZKAI disclosed above.

Figure 10H:
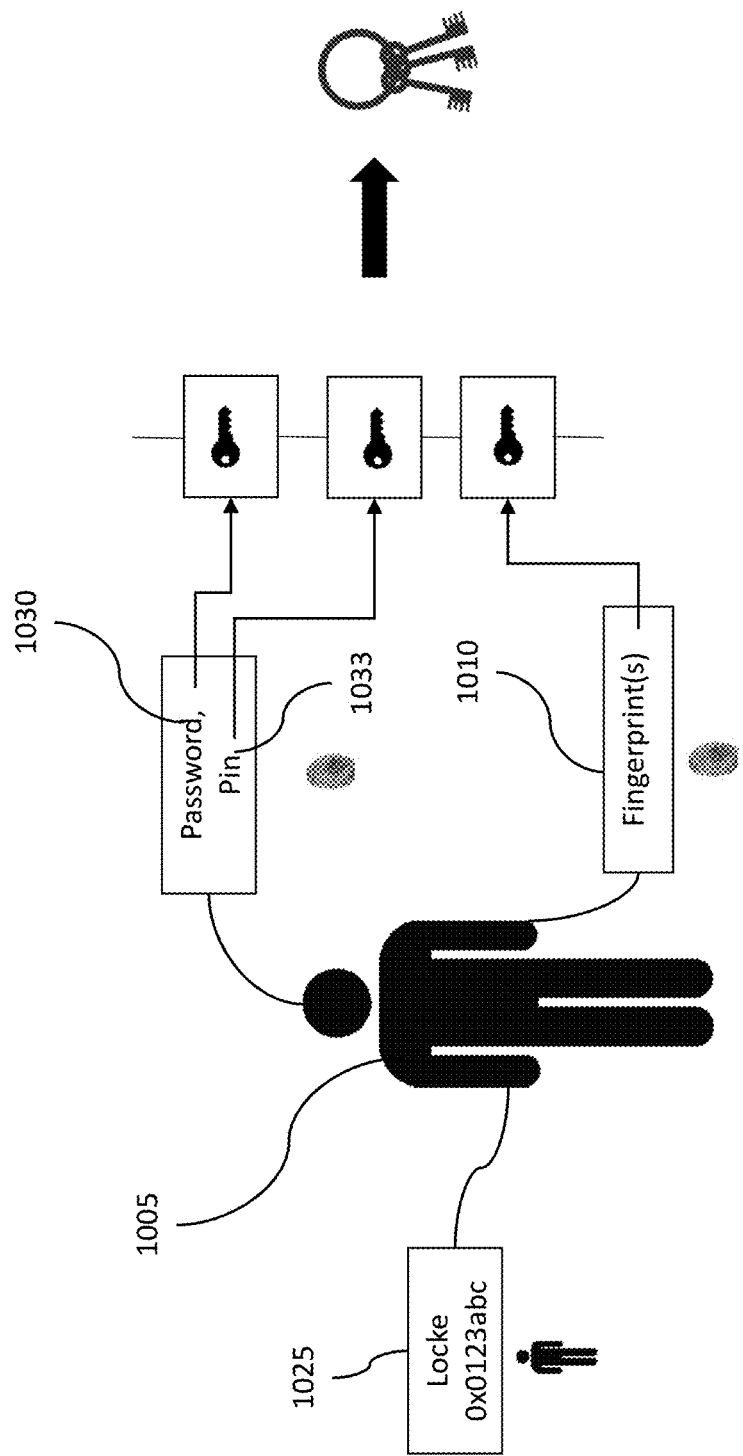
Figure 10I:
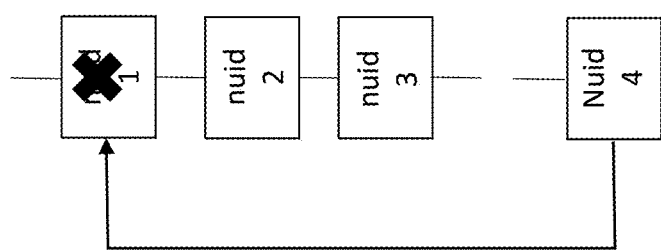

FIG. 10H shows an example of how every Key Fragment combination may be a valid encryption key such that a password 1030, a pin 1033, and fingerprint(s) 1010 may each generate an encryption key stored on the block chain such that the "keyring" grows with the number of auth secrets registered. Some embodiments of the encryption keys correspond to the ZKAI disclosed above. FIG. 10I shows an example of properties of the present disclosure. References in the data structure 1050 allow Key Fragments (e.g., auth secrets) to be replaced or blacklisted. Lost or stolen is less likely to happen and easier to resolve.

What has been disclosed is an improved method, system, and computer program product that performs a zero-knowledge proof of knowledge of user identification and/or authentication. The ZKAI may be generated from a secret user credential. The secret user credential may take the form of any private and reproducible digital information, including but not limited to, for example, passwords, PINs, private keys, biometrics, hardware security modules, and/or algorithmic identifiers. The ZKAI, which may also be derived from the user secret does not contain any private information of the secret user credential, may be appended to a distributed ledger as defined by ledger-specific semantics.

Authentication may then be performed by validating a prover's knowledge, received as secret parameters (e.g., proof data) from the user, wherein a portion of the prover's knowledge was used to generate the ZKAI that was stored in the immutable distributed ledger entry as defined by a zero-knowledge protocol. Authentication may be performed to compare the received secret parameters received from the user against the ZKAI received from the distributed ledger to determine if the user is really who the user claims to be.

It should be noted that for proving and verifying users/participants in some embodiments, trustless or trustful, of the disclosure herein, there is no need for a verifier to register a new user as in traditional authentication flows (e.g., legacy sign-up processes to capture a user's username and password to register the user with the verifier's system). The user instead claims ownership or "provership" of a given transaction on a ledger, to be validated and authenticated by a service. If the service has no existing data keyed on the unique public identifier derived from the claim, such as an explicit username, unique transaction identifier, public key, or otherwise, the user may be considered a new user of the service. The claim of provership serves as the root of trust for subsequent transactions, a concept that is refined and extended in present disclosures.

This departure from legacy processes, when combined with common encryption techniques and any of the numerous distributed storage solutions available, serves as the basis for decentralizing user data to the benefit of both the user, who becomes the proprietor of the information, and the service who no longer must store and protect it. This departure from legacy processes of providing systems and processes to allow user credentials to be stored in a public ledger system in a way that the user credentials stored in the public ledger system provides zero-knowledge of the user's credentials to anyone not the owner of the user's credentials will improve the technical area of online user security management in that no trusted source may be a victim of an attack which may expose a plurality of user personal information because unlike current legacy systems and processes, the disclosed embodiments of this disclosure allow the ability for user credential information (e.g., zero-knowledge authentication information having publicly known parameters, a public version of a user secret, one or more key fragments, etc.), stored in a zero knowledge format, to be publicly available without concern exposing sensitive user information.

The present disclosure improves the technological area of user authentication and management of user credentials stored in a different way (e.g., distributed as opposed to centralized) from legacy approaches which rely heavily on centralized servers and service providers with large "honey pots" of user credentials and data that serve as targets for attackers. Managing user credentials using the disclosed systems and methods provide an approach for a universal storage and access to user-owned credentials for transinstitutional digital authentication.

System Architecture Overview

Figure 11:
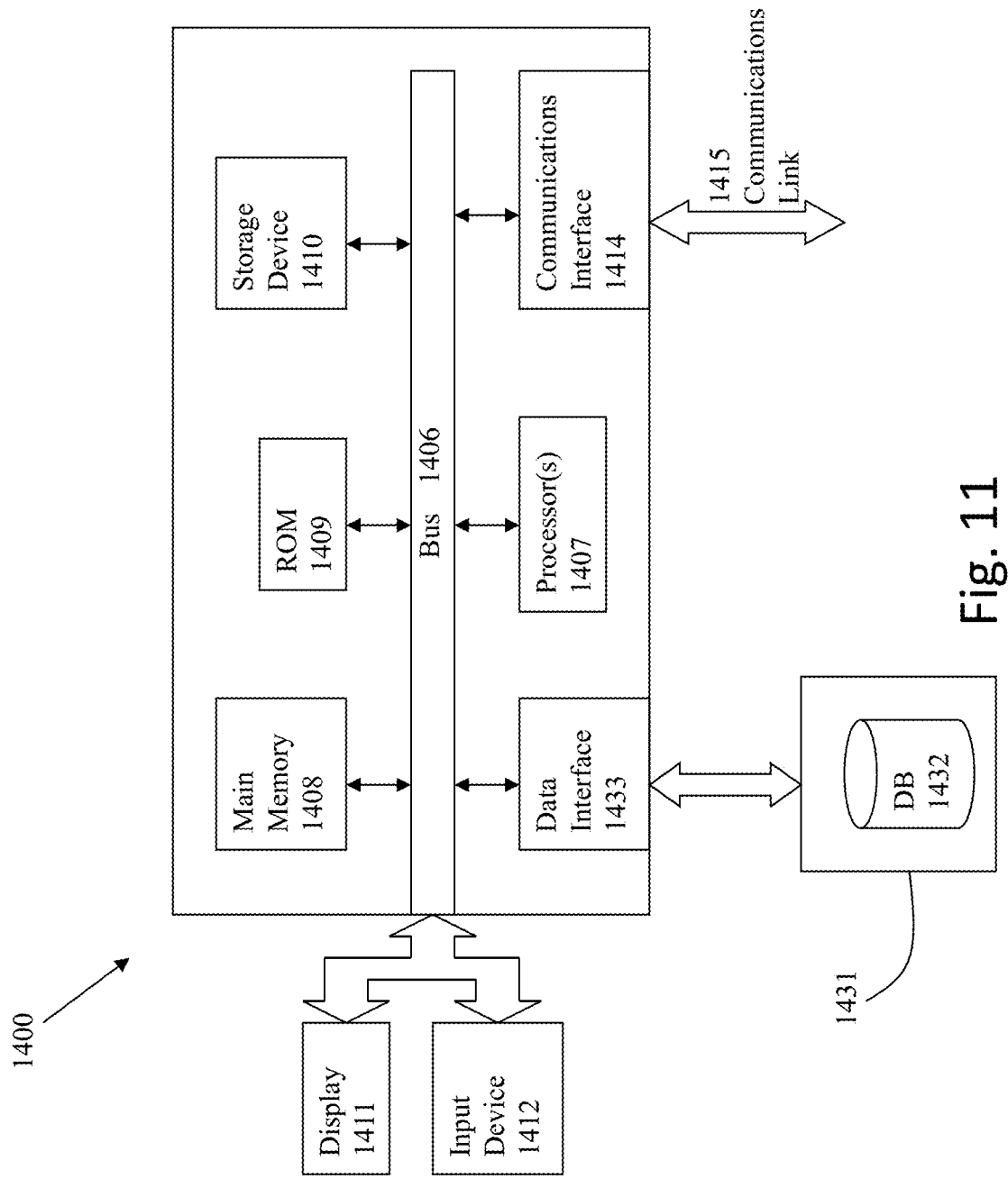
FIG. 11 is a block diagram of an illustrative computing system suitable for implementing an embodiment of the present disclosure.

FIG. 11 is a block diagram of an illustrative computing system 1000 suitable for implementing an embodiment of the present disclosure. Computer system 1000 includes a bus 1006 or other communication mechanism for communicating information, which interconnects subsystems and devices, such as processor 1007, system memory 1008 (e.g., RAM), static storage device 1009 (e.g., ROM), disk drive 1010 (e.g., magnetic or optical), communication interface 1014 (e.g., modem or Ethernet card), display 1011 (e.g., CRT or LCD), input device 1012 (e.g., keyboard), data interface 1033, and cursor control.

According to some embodiments of the disclosure, computer system 1000 performs specific operations by processor 1007 executing one or more sequences of one or more instructions contained in system memory 1008. Such instructions may be read into system memory 1008 from another computer readable/usable medium, such as static storage device 1009 or disk drive 1010. In alternative embodiments, hard-wired circuitry may be used in place of or in combination with software instructions to implement the disclosure. Thus, embodiments of the disclosure are not limited to any specific combination of hardware circuitry and/or software. In some embodiments, the term "logic" shall mean any combination of software or hardware that is used to implement all or part of the disclosure.

The term "computer readable medium" or "computer usable medium" as used herein refers to any medium that participates in providing instructions to processor 1007 for execution. Such a medium may take many forms, including but not limited to, non-volatile media and volatile media. Non-volatile media includes, for example, optical or magnetic disks, such as disk drive 1010. Volatile media includes dynamic memory, such as system memory 1008.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the disclosure, execution of the sequences of instructions to practice the disclosure is performed by a single computer system 1000. According to other embodiments of the disclosure, two or more computer systems 1000 coupled by communication link 1010 (e.g., LAN, PTSN, or wireless network) may perform the sequence of instructions required to practice the disclosure in coordination with one another.

Computer system 1000 may transmit and receive messages, data, and instructions, including program, e.g., application code, through communication link 1015 and communication interface 1014. Received program code may be executed by processor 1007 as it is received, and/or stored in disk drive 1010, or other non-volatile storage for later execution. A database 1032 in a storage medium 1031 may be used to store data accessible by the system 1000 via data interface 1033.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiment" or "in other embodiments" in various places throughout this specification are not necessarily referring to the same embodiment or embodiments.

What is claimed is:

1. A computer-implemented method, comprising:
   identifying zero-knowledge authentication information on a distributed ledger (DL), the zero-knowledge authentication information recorded as a distributed ledger (DL) transaction by:
     identifying a secret user credential from a user,
     generating zero-knowledge authentication information based on at least the secret user credential, wherein the zero-knowledge authentication information is derived at least in part from the secret user credential, and
     storing the zero-knowledge authentication information on a distributed ledger (DL), wherein the zero-knowledge authentication information is stored as a distributed ledger (DL) transaction and the DL transaction does not include the secret user credential; and
   authenticating the user after recording the zero-knowledge authentication information on the DL by:
     receiving proof of knowledge data for the secret user credential,
     comparing the proof of knowledge data to the zero-knowledge authentication information stored in the DL transaction,
     determining that the user is authorized for access based on at least the comparison of the proof of knowledge data to the zero-knowledge authentication information stored in the DL transaction.

2. The method of claim 1, further comprising:
   receiving a transaction ID for the DL transaction; and
   registering the transaction ID as being associated with the user.

3. The method of claim 1, wherein the proof of knowledge data comprises one or more parameters for the comparison of the proof of knowledge data to the zero-knowledge authentication information recorded as the DL transaction on the DL, the one or more parameters generated based at least in part on the user secret credential.

4. The method of claim 1, wherein the zero-knowledge authentication information recorded as the DL transaction on the distributed ledger (DL) was generated in response to a user request, the user request comprising:
   a user ID uniquely identifying the user; and
   the secret user credential, wherein the secret user credential is privately held reproducible digital information that is reproducible by the user.

5. The method of claim 4, wherein the zero-knowledge authentication information comprises one or more randomly generated integers of an order of a specified elliptical curve and a parameter derived at least in part from a one-way hash function of at least the secret user credential.

6. The method of claim 1, wherein the zero-knowledge authentication information is generated based at least in part on a non-interactive sigma protocol with a Fiat-Shamir transform and a specified elliptic curve.

7. The method of claim 1, wherein the DL transaction comprises:
   transaction metadata;
   the zero-knowledge authentication information; and
   an extension.

8. The method of claim 7, wherein the extension is a minimum-security threshold.

9. The method of claim 1, further comprising retrieving the zero-knowledge authentication information in the DL transaction from the DL, and wherein the zero-knowledge authentication information is generated by a user computing device.

10. A computer system, comprising:
    a memory to hold a set of instructions;
    a computer processor to execute the set of instructions, in which the set of instructions when executed cause a set of acts, the set of acts comprising:
    identifying zero-knowledge authentication information on a distributed ledger (DL), the zero-knowledge authentication information recorded as a distributed ledger (DL) transaction by:
      identifying a secret user credential from a user,
      generating zero-knowledge authentication information based on at least the secret user credential, wherein the zero-knowledge authentication information is derived at least in part from the secret user credential, and
      storing the zero-knowledge authentication information on a distributed ledger (DL), wherein the zero-knowledge authentication information is stored as a distributed ledger (DL) transaction and the DL transaction does not include the secret user credential; and
    authenticating the user after recording the zero-knowledge authentication information on the DL by:
      receiving proof of knowledge data for the secret user credential,
      comparing the proof of knowledge data to the zero-knowledge authentication information stored in the DL transaction,
      determining that the user is authorized for access based on at least the comparison of the proof of knowledge data to the zero-knowledge authentication information stored in the DL transaction.

11. The computer system of claim 10, wherein the set of acts further comprise:
    receiving a transaction ID for the DL transaction; and
    registering the transaction ID as being associated with the user.

12. The computer system of claim 10, wherein the proof of knowledge data comprises one or more parameters for the comparison of the proof of knowledge data to the zero-knowledge authentication information recorded as the DL transaction on the DL, the one or more parameters generated based at least in part on the user secret credential.

13. The computer system of claim 10, wherein the zero-knowledge authentication information recorded as the DL transaction on the distributed ledger (DL) was generated in response to a user request, the user request comprising:
   a user ID uniquely identifying the user; and
   the secret user credential, wherein the secret user credential is privately held reproducible digital information that is reproducible by the user.

14. The computer system of claim 13, wherein the zero-knowledge authentication information comprises one or more randomly generated integers of an order of a specified elliptical curve and a parameter derived at least in part from a one-way hash function of at least the secret user credential.

15. The computer system of claim 10, wherein the zero-knowledge authentication information is generated based at least in part on a non-interactive sigma protocol with a Fiat-Shamir transform and a specified elliptic curve.

16. The computer system of claim 10, wherein the DL transaction comprises:
   transaction metadata;
   the zero-knowledge authentication information; and
   an extension.

17. The computer system of claim 16, wherein the extension is a minimum-security threshold.

18. The computer system of claim 10, wherein the set of acts further comprise retrieving the zero-knowledge authentication information in the DL transaction from the DL, and wherein the zero-knowledge authentication information is generated by a user computing device.

19. A non-transitory computer readable medium having stored thereon a set of instructions which, when executed by a processor, causes a set of acts, the set of acts comprising:
   identifying zero-knowledge authentication information on a distributed ledger (DL), the zero-knowledge authentication information recorded as a distributed ledger (DL) transaction by:
      identifying a secret user credential from a user,
      generating zero-knowledge authentication information based on at least the secret user credential, wherein the zero-knowledge authentication information is derived at least in part from the secret user credential, and
      storing the zero-knowledge authentication information on a distributed ledger (DL), wherein the zero-knowledge authentication information is stored as a distributed ledger (DL) transaction and the DL transaction does not include the secret user credential; and
   authenticating the user after recording the zero-knowledge authentication information on the DL by:
      receiving proof of knowledge data for the secret user credential,
      comparing the proof of knowledge data to the zero-knowledge authentication information stored in the DL transaction,
      determining that the user is authorized for access based on at least the comparison of the proof of knowledge data to the zero-knowledge authentication information stored in the DL transaction.

20. The computer readable medium of claim 19, wherein the set of acts further comprise:
   receiving a transaction ID for the DL transaction; and
   registering the transaction ID as being associated with the user.

21. The computer readable medium of claim 19, wherein the proof of knowledge data comprises one or more parameters for the comparison of the proof of knowledge data to the zero-knowledge authentication information recorded as the DL transaction on the DL, the one or more parameters generated based at least in part on the user secret credential.

22. The computer readable medium of claim 19, wherein the zero-knowledge authentication information recorded as the DL transaction on the distributed ledger (DL) was generated in response to a user request, the user request comprising:
   a user ID uniquely identifying the user; and
   the secret user credential, wherein the secret user credential is privately held reproducible digital information that is reproducible by the user.

23. The computer readable medium of claim 22, wherein the zero-knowledge authentication information comprises one or more randomly generated integers of an order of a specified elliptical curve and a parameter derived at least in part from a one-way hash function of at least the secret user credential.

24. The computer readable medium of claim 19, wherein the zero-knowledge authentication information is generated based at least in part on a non-interactive sigma protocol with a Fiat-Shamir transform and a specified elliptic curve.

25. The computer readable medium of claim 19, wherein the DL transaction comprises:
   transaction metadata;
   the zero-knowledge authentication information; and
   an extension.

26. The computer readable medium of claim 25, wherein the extension is a minimum-security threshold.

27. The computer readable medium of claim 19, wherein the set of acts further comprise retrieving the zero-knowledge authentication information in the DL transaction from the DL, and wherein the zero-knowledge authentication information is generated by a user computing device.

* * * * *